United States Patent
Johnson et al.

(10) Patent No.: US 6,748,040 B1
(45) Date of Patent: Jun. 8, 2004

(54) APPARATUS AND METHOD FOR EFFECTING SYNCHRONY IN A WIRELESS COMMUNICATION SYSTEM

(75) Inventors: Timothy A. Johnson, New Hope, AL (US); Preston Jett, Huntsville, AL (US)

(73) Assignee: Time Domain Corporation, Huntsville, AL (US)

( * ) Notice: Subject to any disclaimer, the term of this patent is extended or adjusted under 35 U.S.C. 154(b) by 533 days.

(21) Appl. No.: 09/711,026

(22) Filed: Nov. 9, 2000

(51) Int. Cl.$^7$ .............................................. H04L 7/00
(52) U.S. Cl. ...................................................... 375/354
(58) Field of Search ................................ 375/354, 355, 375/356, 358, 316, 376

(56) References Cited

U.S. PATENT DOCUMENTS

| | | | |
|---|---|---|---|
| 4,641,317 A | 2/1987 | Fullerton | 375/1 |
| 4,743,906 A | 5/1988 | Fullerton | 342/27 |
| 4,813,057 A | 3/1989 | Fullerton | 375/37 |
| 4,979,186 A | 12/1990 | Fullerton | 375/23 |
| 5,363,108 A | 11/1994 | Fullerton | 342/27 |
| 5,677,927 A | 10/1997 | Fullerton et al. | 375/200 |
| 5,687,169 A | 11/1997 | Fullerton | 370/324 |
| 5,832,035 A | 11/1998 | Fullerton | 375/210 |
| 6,069,915 A * | 5/2000 | Hulbert | 375/150 |
| 6,222,891 B1 * | 4/2001 | Liu et al. | 375/326 |

FOREIGN PATENT DOCUMENTS

| WO | WO 96 41432 A | 12/1996 |
|---|---|---|
| WO | WO 01 93446 A | 12/2001 |

OTHER PUBLICATIONS

PCT International Search Report of Jun. 21, 2002 relating to cited prior art references.

* cited by examiner

*Primary Examiner*—Khai Tran
(74) *Attorney, Agent, or Firm*—Law Office of Donald D. Mondul

(57) ABSTRACT

An apparatus for effecting synchrony with a received transmitted signal in a wireless communication system is disclosed. The transmitted signal is encoded according to a predetermined coding scheme and arranged in a plurality of first frames in a first succession having a first period. The apparatus comprises: (a) a timing circuit for generating a trigger signal for effecting periodic sampling of the transmitted signal at a sampling node; the trigger signal and the transmitted signal cooperate at the sampling node to generate a detection indication signal; (b) a reference signal source for generating a reference signal for the timing circuit in a plurality of second frames in a second succession having a second period; an amount by which the first period and the second period differ establishes a base offset; (c) an offset generator device; the offset generator device is coupled with the sampling node and with the timing circuit; the offset generator device receives the detection indication signal. The offset generator device determines a code offset related to elapsed time following a beginning of a respective frame of the plurality of first frames during which an expression encoded according to the predetermined coding scheme may be received. The offset generator device generates a frame offset signal by which to effect adjusting sending the trigger signal by the timing circuit from the second period to adjust synchrony with the transmitted signal. The frame offset signal involves the base offset and the code offset.

24 Claims, 19 Drawing Sheets

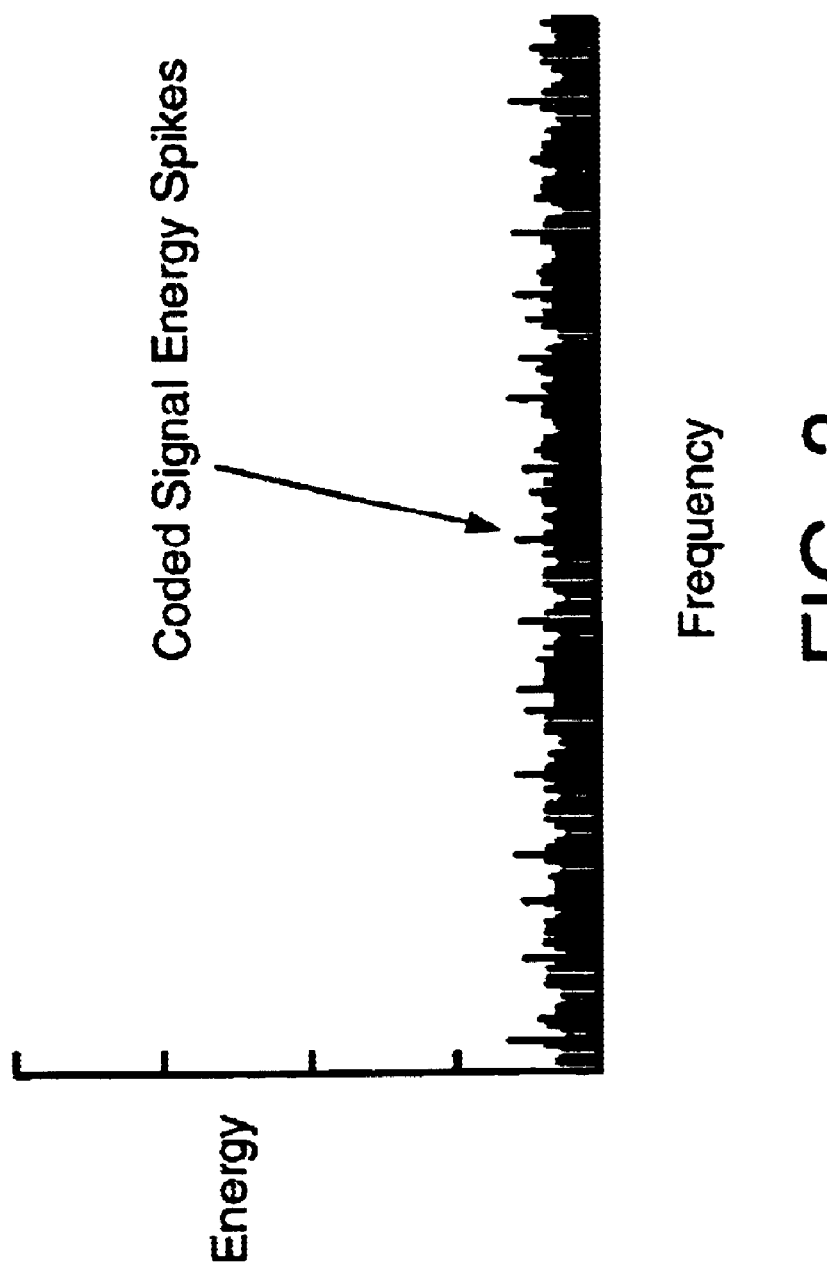

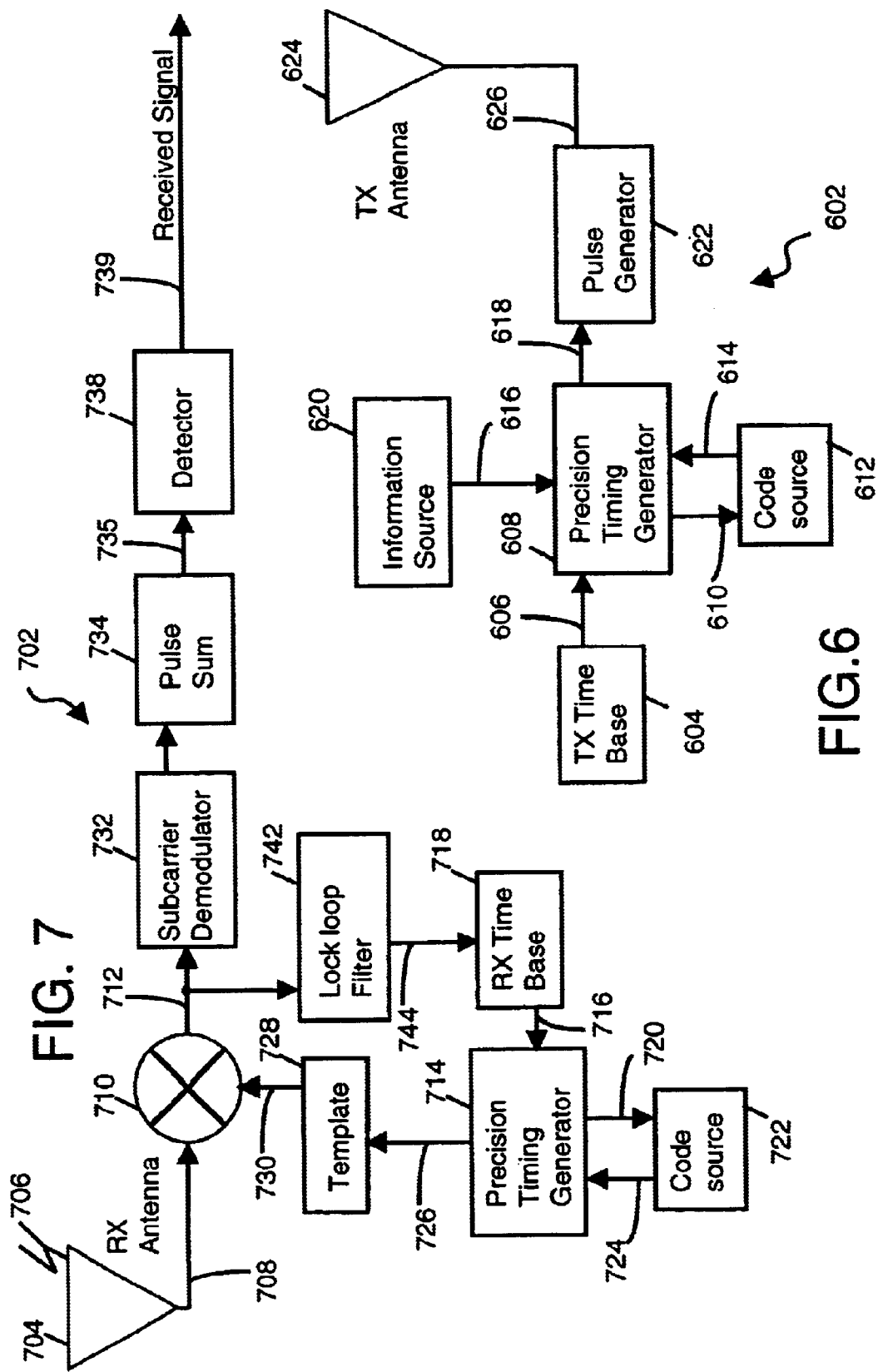

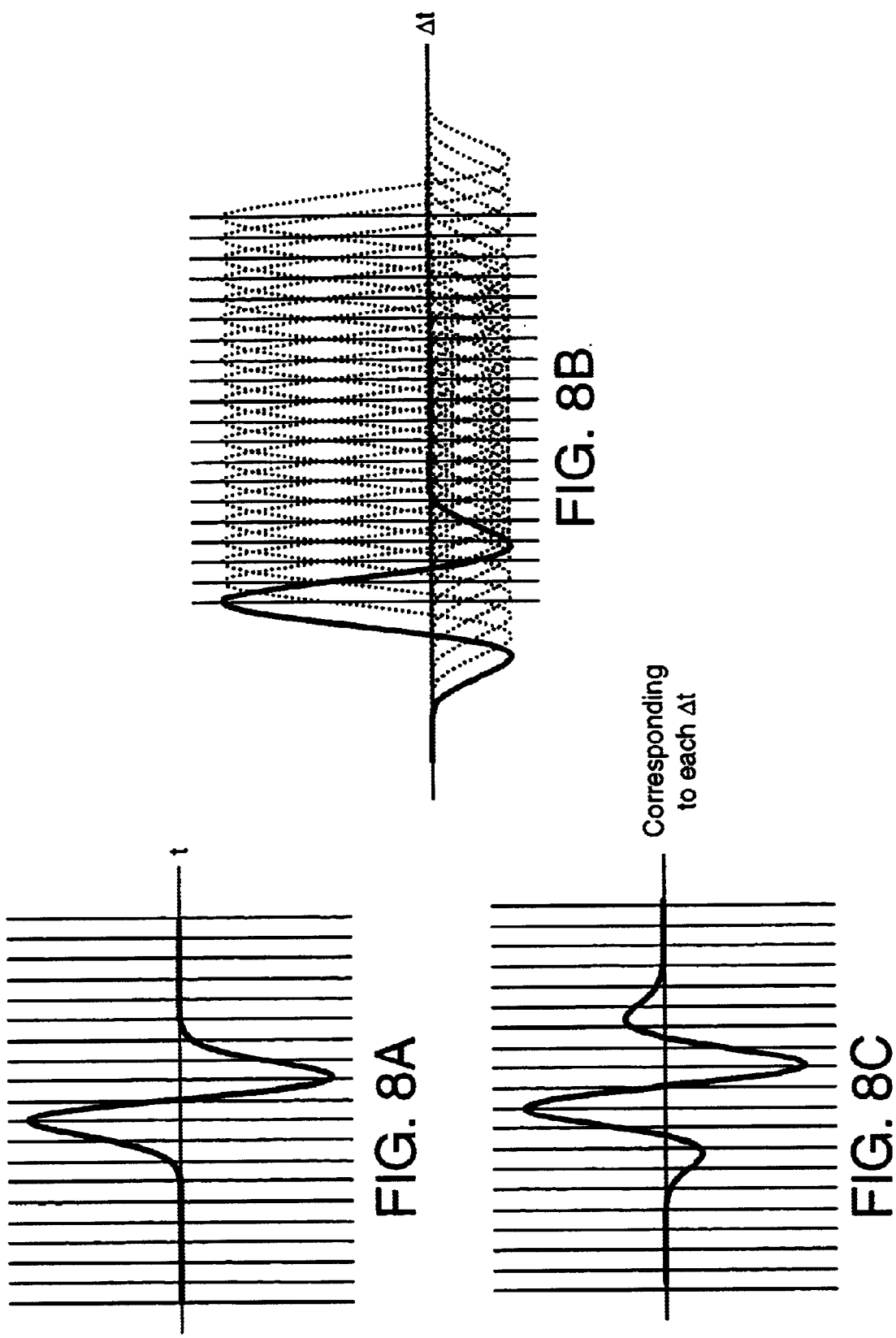

APPARATUS AND METHOD FOR EFFECTING SYNCHRONY IN A WIRELESS COMMUNICATION SYSTEM

BACKGROUND OF THE INVENTION

1. Field of the Invention

The present invention relates generally to radio communication effected using time modulated pulses, and in particular wireless communications using time modulated ultra-wideband pulses, such as impulse radio. Still more particularly the present invention provides an apparatus and method for effecting synchrony in a wireless communication system. Wireless communication systems, and especially wireless communication systems conveying coded message transmissions, require a close synchrony between receiving stations and received transmitted signals in order that the intelligence contained in the transmitted messages may be properly understood at the receiver station. A key element in establishing such synchrony is the timing system by which appropriate sampling of the received transmitted signal is carried out.

Prior art wireless communication systems have employed frequency-variable devices for establishing the desired synchrony between a receiver station and a received transmitted signal. One example of such a prior art synchronizing device, a voltage-controlled oscillator (VCO), is used for synchronizing with a trigger pulse contained within the received transmitted signal. In order to move the start point of a frame of a receiver signal to align with (i.e., to synchronize with) the frame pattern of the received transmitted signal, the frequency of the output of the VCO is varied by changing the input control voltage provided to the VCO. Synchronizing may occur in two general contexts: acquisition—when a receiver is seeking to first synchronize with a received signal, and tracking—when a receiver has synchronized with a received signal and seeks to maintain synchrony.

VCO timing control circuits are expensive and their performance yields too slow a response time in adjusting to a received transmitted signal to maintain the desired synchrony. Operational disadvantages caused by such limitations are exacerbated when encountered in connection with such a highly time-dependent wireless protocol as impulse radio communications. The VCO devices available for synchronizing (acquisition and tracking) in wireless communications have an unacceptably low bandwidth capacity and have too much inertia. They are unacceptably slow in their response, largely because of the high "Q" values incorporated into their designs. Also, VCO devices are too limited in their range of control to meet the highly agile algorithmic needs of ultrawide band systems.

There is a need for an apparatus and method for effecting synchrony in a wireless communication system that is agile in its response to a received transmitted signal.

There is a need for such an agile synchronizing apparatus and method that is less expensive to implement than the presently available voltage-controlled oscillator (VCO) implementations.

2. Related Art

Recent advances in communications technology have enabled an emerging, revolutionary ultra wideband technology (UWB) called impulse radio communications systems (hereinafter called impulse radio).

Impulse radio was first fully described in a series of patents, including U.S. Pat. No. 4,641,317 (issued Feb. 3, 1987), U.S. Pat. No. 4,813,057 (issued Mar. 14, 1989), U.S. Pat. No. 4,979,186 (issued Dec. 18, 1990) and U.S. Pat. No. 5,363,108 (issued Nov. 8, 1994) to Larry W. Fullerton. A second generation of impulse radio patents include U.S. Pat. No. 5,677,927 (issued Oct. 14, 1997) to Fullerton et al; and U.S. Pat. No. 5,687,169 (issued Nov. 11, 1997) and U.S. Pat. No. 5,832,035 (issued Nov. 3, 1998) to Fullerton. These patent documents are incorporated herein by reference.

Uses of impulse radio systems are described in U.S. patent application Ser. No. 09/332,502, entitled, "System and Method for Intrusion Detection Using a Time Domain Radar Array," and U.S. patent application Ser. No. 09/332,503, entitled, "Wide Area Time Domain Radar Array," both filed Jun. 14, 1999, both of which are assigned to the assignee of the present invention, and both of which are incorporated herein by reference.

Basic impulse radio transmitters emit short pulses approaching a Gaussian monocycle with tightly controlled pulse-to-pulse intervals. Impulse radio systems typically use pulse position modulation, which is a form of time modulation where the value of each instantaneous sample of a modulating signal is caused to modulate the position of a pulse in time.

For impulse radio communications, the pulse-to-pulse interval is varied on a pulse-by-pulse basis by two components: an information component and a pseudo-random code component. Unlike direct sequence spread spectrum systems, the pseudo-random code for impulse radio communications is not necessary for energy spreading because the monocycle pulses themselves have an inherently wide bandwidth. Instead, the pseudo-random code of an impulse radio system is used for channelization, energy smoothing in the frequency domain and for interference suppression.

Generally speaking, an impulse radio receiver is a direct conversion receiver with a cross correlator front end. The front end coherently converts an electromagnetic pulse train of monocycle pulses to a baseband signal in a single stage. The data rate of the impulse radio transmission is typically a fraction of the periodic timing signal used as a time base. Because each data bit modulates the time position of many pulses of the periodic timing signal, this yields a modulated, coded timing signal that comprises a train of identically shaped pulses for each single data bit. The impulse radio receiver integrates multiple pulses to recover the transmitted information.

In a multi-user environment, impulse radio depends, in part, on processing gain to achieve rejection of unwanted signals. Because of the extremely high processing gain achievable with impulse radio, much higher dynamic ranges are possible than are commonly achieved with other spread spectrum methods, some of which must use power control in order to have a viable system. Further, if power is kept to a minimum in an impulse radio system, this will allow closer operation in co-site or nearly co-site situations where two impulse radios must operate concurrently, or where an impulse radio and a narrow band radio must operate close by one another and share the same band.

In some multi-user environments where there is a high density of users in a coverage area or where data rates are so high that processing gain is marginal, power control may be used to reduce the multi-user background noise to improve the number of channels available and the aggregate traffic density of the area.

Wireless communication systems such as impulse radio communication systems that convey coded message transmissions require a close synchrony between receiving stations and received transmitted signals in order that the intelligence contained in the transmitted messages may be properly understood at the receiver station. A key element in establishing such synchrony is the timing system by which appropriate sampling of the received transmitted signal is carried out.

There is a need for an apparatus and method for effecting synchrony in a wireless communication system that is agile in its response to a received transmitted signal.

There is a need for such an agile synchronizing apparatus and method that is less expensive to implement than the presently available voltage-controlled oscillator (VCO) implementations.

SUMMARY OF THE INVENTION

An apparatus for effecting synchrony with a received transmitted signal in a wireless communication system is disclosed. The transmitted signal is encoded according to a predetermined coding scheme and arranged in a plurality of first frames in a first succession having a first period. The apparatus comprises: (a) a timing circuit for generating a trigger signal for effecting periodic sampling of the transmitted signal at a sampling node; the trigger signal and the transmitted signal cooperate at the sampling node to generate a detection indication signal; (b) a reference signal source for generating a reference signal for the timing circuit in a plurality of second frames in a second succession having a second period; an amount by which the first period and the second period differ establishes a base offset; (c) an offset generator device; the offset generator device is coupled with the sampling node and with the timing circuit; the offset generator device receives the detection indication signal. The offset generator device determines a code offset related to elapsed time following a beginning of a respective frame of the plurality of first frames during which an expression encoded according to the predetermined coding scheme may be received. The offset generator device generates a frame offset signal by which to effect adjusting sending the trigger signal by the timing circuit from the second period to adjust synchrony with the transmitted signal. The frame offset signal involves the base offset and the code offset.

The method comprises the steps of: (a) generating a trigger signal for effecting periodic sampling of the transmitted signal at a sampling node; the trigger signal and the transmitted signal cooperate at the sampling node to generate a detection indication signal; (b) generating a reference signal for the timing circuit in a plurality of second frames in a second succession having a second period; an amount by which the first period and the second period differ establishes a base offset; (c) determining a code offset related to elapsed time following a beginning of a respective frame of the plurality of first frames during which an expression encoded according to the predetermined coding scheme may be received; (d) generating a frame offset signal involving the base offset and the code offset; (e) applying the frame offset signal to adjust sending the trigger signal from the second period to adjust synchrony with the transmitted signal.

It is therefore an object of the present invention to provide an apparatus and method for effecting synchrony in a wireless communication system that is agile in its response to a received transmitted signal.

It is a further object of the present invention to provide an apparatus and method for effecting synchrony in a wireless communication system that is less expensive to implement that the presently available voltage-controlled oscillator (VCO) implementations.

Further objects and features of the present invention will be apparent from the following specification and claims when considered in connection with the accompanying drawings illustrating the preferred embodiments of the invention.

BRIEF DESCRIPTION OF THE DRAWINGS

FIG. 3 illustrates the frequency domain amplitude of a sequence of time coded pulses.

FIG. 6 illustrates a representative impulse radio transmitter functional diagram.

FIG. 7 illustrates a representative impulse radio receiver functional diagram.

FIG. 8A illustrates a representative received pulse signal at the input to the correlator.

FIG. 8B illustrates a sequence of representative impulse signals in the correlation process.

FIG. 8C illustrates the output of the correlator for each of the time offsets of FIG. 8B.

DETAILED DESCRIPTION OF THE EMBODIMENTS

Overview of the Invention

Figure 1B:
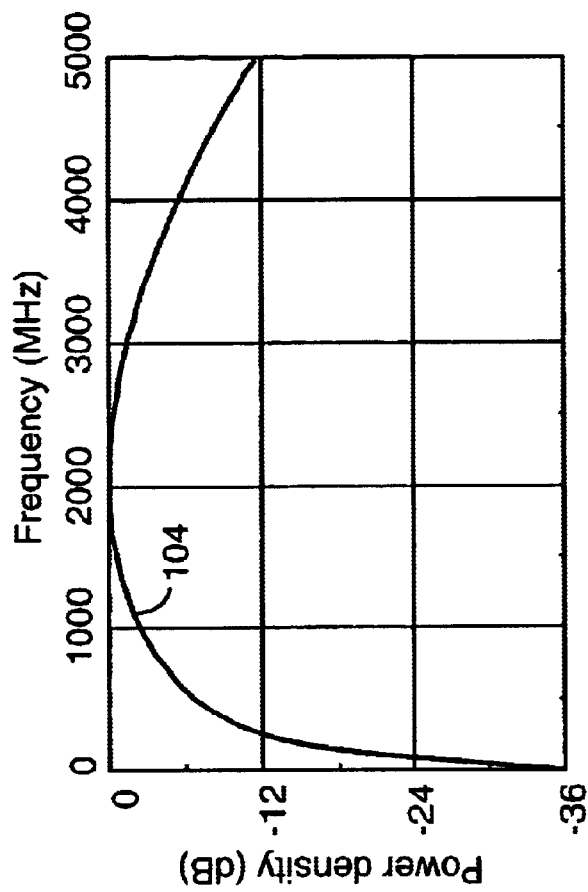
FIG. 1B illustrates the frequency domain amplitude of the Gaussian Monocycle of FIG. 1A.

The present invention will now be described more fully in detail with reference to the accompanying drawings, in which the preferred embodiments of the invention are shown. This invention should not, however, be construed as limited to the embodiments set forth herein; rather, they are provided so that this disclosure will be thorough and complete and will fully convey the scope of the invention to those skilled in art.

Impulse Radio Basics

This section is directed to technology basics and provides the reader with an introduction to impulse radio concepts, as well as other relevant aspects of communications theory. This section includes subsections relating to waveforms, pulse trains, coding for energy smoothing and channelization, modulation, reception and demodulation, interference resistance, processing gain, capacity, multipath and propagation, distance measurement, and qualitative and quantitative characteristics of these concepts. It should be understood that this section is provided to assist the reader with understanding the present invention, and should not be used to limit the scope of the present invention.

Impulse radio refers to a radio system based on short, low duty cycle pulses. An ideal impulse radio waveform is a short Gaussian monocycle. As the name suggests, this waveform attempts to approach one cycle of radio frequency (RF) energy at a desired center frequency. Due to implementation and other spectral limitations, this waveform may be altered significantly in practice for a given application. Most waveforms with enough bandwidth approximate a Gaussian shape to a useful degree.

Impulse radio can use many types of modulation, including AM, time shift (also referred to as pulse position) and M-ary versions. The time shift method has simplicity and power output advantages that make it desirable. In this document, the time shift method is used as an illustrative example.

In impulse radio communications, the pulse-to-pulse interval can be varied on a pulse-by-pulse basis by two components: an information component and a pseudo-random code component. Generally, conventional spread spectrum systems make use of pseudo-random codes to spread the normally narrow band information signal over a relatively wide band of frequencies. A conventional spread spectrum receiver correlates these signals to retrieve the original information signal. Unlike conventional spread spectrum systems, the pseudo-random code for impulse radio communications is not necessary for energy spreading because the monocycle pulses themselves have an inherently wide bandwidth. Instead, the pseudo-random code is used for channelization, energy smoothing in the frequency domain, resistance to interference, and reducing the interference potential to nearby receivers.

The impulse radio receiver is typically a direct conversion receiver with a cross correlator front end in which the front end coherently converts an electromagnetic pulse train of monocycle pulses to a baseband signal in a single stage. The baseband signal is the basic information signal for the impulse radio communications system. It is often found desirable to include a subcarrier with the baseband signal to help reduce the effects of amplifier drift and low frequency noise. The subcarrier that is typically implemented alternately reverses modulation according to a known pattern at a rate faster than the data rate. This same pattern is used to reverse the process and restore the original data pattern just before detection. This method permits alternating current (AC) coupling of stages, or equivalent signal processing to eliminate direct current (DC) drift and errors from the detection process. This method is described in detail in U.S. Pat. No. 5,677,927 to Fullerton et al.

In impulse radio communications utilizing time shift modulation, each data bit typically time position modulates many pulses of the periodic timing signal. This yields a modulated, coded timing signal that comprises a train of identically shaped pulses for each single data bit. The impulse radio receiver integrates multiple pulses to recover the transmitted information.

Waveforms

Impulse radio refers to a radio system based on short, low duty cycle pulses. In the widest bandwidth embodiment, the resulting waveform approaches one cycle per pulse at the center frequency. In more narrow band embodiments, each pulse consists of a burst of cycles usually with some spectral shaping to control the bandwidth to meet desired properties such as out of band emissions or in-band spectral flatness, or time domain peak power or burst off time attenuation.

For system analysis purposes, it is convenient to model the desired waveform in an ideal sense to provide insight into the optimum behavior for detail design guidance. One such waveform model that has been useful is the Gaussian monocycle as shown in FIG. 1A. This waveform is representative of the transmitted pulse produced by a step function into an ultra-wideband antenna. The basic equation normalized to a peak value of 1 is as follows:

$$f_{mono}(t) = \sqrt{e}\left(\frac{t}{\sigma}\right)e^{\frac{-t^2}{2\sigma^2}}$$

Figure 1A:
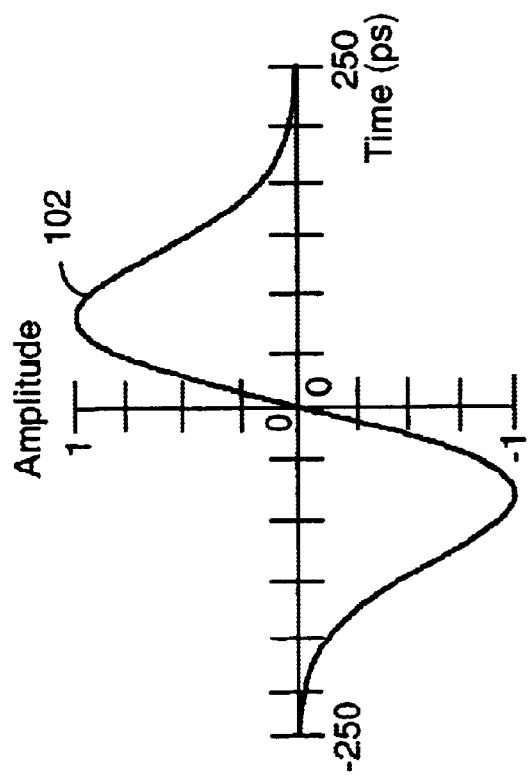
FIG. 1A illustrates a representative Gaussian Monocycle waveform in the time domain.

Where, $\sigma$ is a time scaling parameter, t is time, $f_{mono}(t)$ is the waveform voltage, and e is the natural logarithm base, The frequency domain spectrum of the above waveform is shown in FIG. 1B. The corresponding equation is:

$$F_{momo}(f) = (2\pi)^{\frac{3}{2}}\sigma f e^{-2(\pi\sigma f)^2}$$

The center frequency ($f_c$), or frequency of peak spectral density is:

$$f_c = \frac{1}{2\pi\sigma}$$

These pulses, or bursts of cycles, may be produced by methods described in the patents referenced above or by other methods that are known to one of ordinary skill in the art. Any practical implementation will deviate from the ideal mathematical model by some amount. In fact, this deviation from ideal may be substantial and yet yield a system with acceptable performance. This is especially true for microwave implementations, where precise waveform shaping is difficult to achieve. These mathematical models are provided as an aid to describing ideal operation and are not intended to limit the invention. In fact, any burst of cycles that adequately fills a given bandwidth and has an adequate on-off attenuation ratio for a given application will serve the purpose of this invention.

A Pulse Train

Impulse radio systems can deliver one or more data bits per pulse; however, impulse radio systems more typically use pulse trains, not single pulses, for each data bit. As described in detail in the following example system, the impulse radio transmitter produces and outputs a train of pulses for each bit of information.

Figures 2A, 2B:
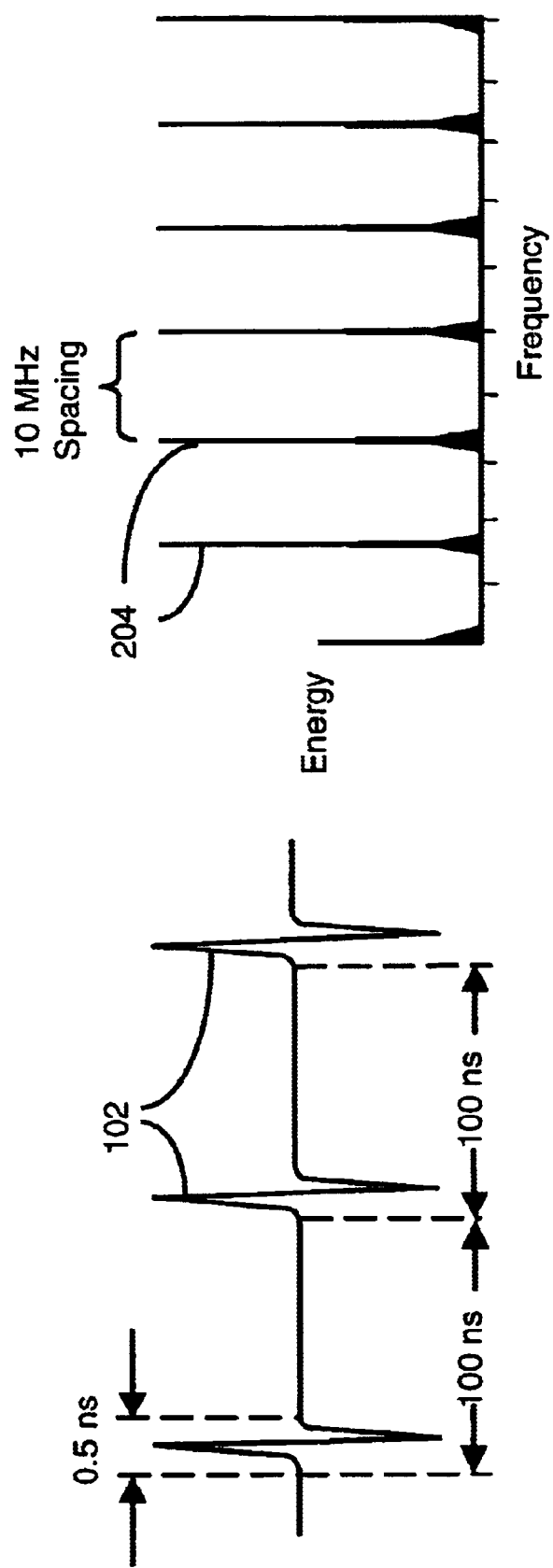
FIG. 2A illustrates a pulse train comprising pulses as in FIG. 1A.
FIG. 2B illustrates the frequency domain amplitude of the waveform of FIG. 2A.

Prototypes built by the inventors have pulse repetition frequencies including 0.7 and 10 megapulses per second (Mpps, where each megapulse is $10^6$ pulses). FIGS. 2A and 2B are illustrations of the output of a typical 10 Mpps system with uncoded, unmodulated, 0.5 nanosecond (ns) pulses 102. FIG. 2A shows a time domain representation of this sequence of pulses 102. FIG. 2B, which shows 60 MHz at the center of the spectrum for the waveform of FIG. 2A, illustrates that the result of the pulse train in the frequency domain is to produce a spectrum comprising a set of lines 204 spaced at the frequency of the 10 Mpps pulse repetition rate. When the full spectrum is shown, the envelope of the line spectrum follows the curve of the single pulse spectrum 104 of FIG. 1B. For this simple uncoded case, the power of the pulse train is spread among roughly two hundred comb lines. Each comb line thus has a small fraction of the total power and presents much less of an interference problem to receiver sharing the band.

It can also be observed from FIG. 2A that impulse radio systems typically have very low average duty cycles resulting in average power significantly lower than peak power. The duty cycle of the signal in the present example is 0.5%, based on a 0.5 ns pulse in a 100 ns interval.

Coding for Energy Smoothing and Channelization

For high pulse rate systems, it may be necessary to more finely spread the spectrum than is achieved by producing comb lines. This may be done by pseudo-randomly positioning each pulse relative to its nominal position.

FIG. 3 is a plot illustrating the impact of a pseudo-noise (PN) code dither on energy distribution in the frequency domain (A pseudo-noise, or PN code is a set of time positions defining the pseudo-random positioning for each pulse in a sequence of pulses). FIG. 3, when compared to FIG. 2B, shows that the impact of using a PN code is to destroy the comb line structure and spread the energy more uniformly. This structure typically has slight variations which are characteristic of the specific code used.

The PN code also provides a method of establishing independent communication channels using impulse radio. PN codes can be designed to have low cross correlation such that a pulse train using one code will seldom collide on more than one or two pulse positions with a pulses train using another code during any one data bit time. Since a data bit may comprise hundreds of pulses, this represents a substantial attenuation of the unwanted channel.

Modulation

Any aspect of the waveform can be modulated to convey information. Amplitude modulation, phase modulation, frequency modulation, time shift modulation and M-ary versions of these have been proposed. Both analog and digital forms have been implemented. Of these, digital time shift modulation has been demonstrated to have various advantages and can be easily implemented using a correlation receiver architecture.

Digital time shift modulation can be implemented by shifting the coded time position by an additional amount (that is, in addition to PN code dither) in response to the information signal. This amount is typically very small relative to the PN code shift. In a 10 Mpps system with a center frequency of 2 GHz., for example, the PN code may command pulse position variations over a range of 100 ns; whereas, the information modulation may only deviate the pulse position by 150 ps.

Thus, in a pulse train of n pulses, each pulse is delayed a different amount from its respective time base clock position by an individual code delay amount plus a modulation amount, where n is the number of pulses associated with a given data symbol digital bit.

Modulation further smooths the spectrum, minimizing structure in the resulting spectrum.

Reception and Demodulation

Clearly, if there were a large number of impulse radio users within a confined area, there might be mutual interference. Further, while the PN coding minimizes that interference, as the number of users rises, the probability of an individual pulse from one user's sequence being received simultaneously with a pulse from another user's sequence increases. Impulse radios are able to perform in these environments, in part, because they do not depend on receiving every pulse. The impulse radio receiver performs a correlating, synchronous receiving function (at the RF level) that uses a statistical sampling and combining of many pulses to recover the transmitted information.

Impulse radio receivers typically integrate from 1 to 1000 or more pulses to yield the demodulated output. The optimal number of pulses over which the receiver integrates is dependent on a number of variables, including pulse rate, bit rate, interference levels, and range.

Interference Resistance

Besides channelization and energy smoothing, the PN coding also makes impulse radios highly resistant to interference from all radio communications systems, including other impulse radio transmitters. This is critical as any other signals within the band occupied by an impulse signal potentially interfere with the impulse radio. Since there are currently no unallocated bands available for impulse systems, they must share spectrum with other conventional radio systems without being adversely affected. The PN code helps impulse systems discriminate between the intended impulse transmission and interfering transmissions from others.

Figure 4:
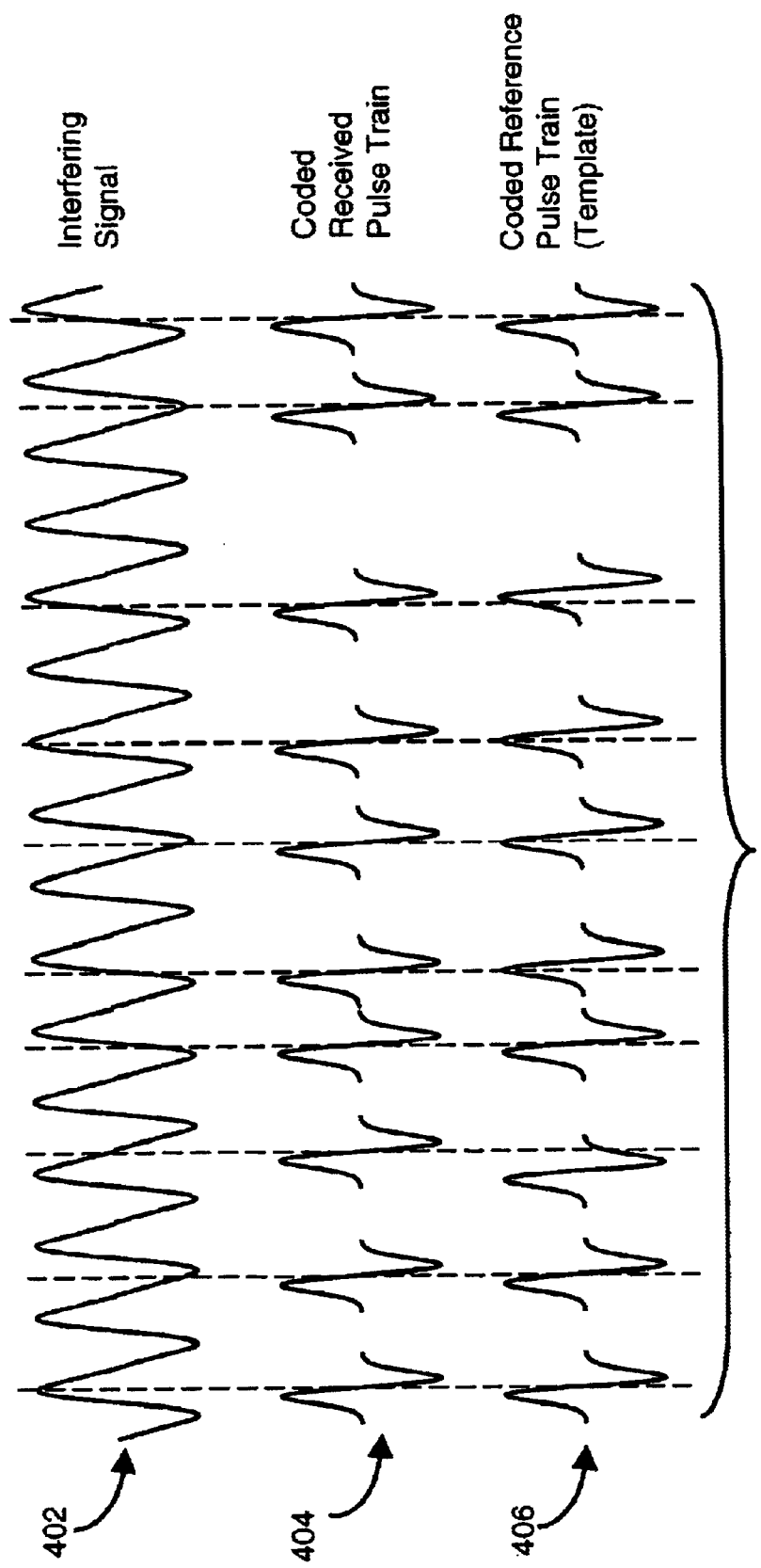
FIG. 4 illustrates a typical received signal and interference signal.

FIG. 4 illustrates the result of a narrow band sinusoidal interference signal 402 overlaying an impulse radio signal 404. At the impulse radio receiver, the input to the cross correlation would include the narrow band signal 402, as well as the received ultrawide-band impulse radio signal 404. The input is sampled by the cross correlator with a PN dithered template signal 406. Without PN coding, the cross correlation would sample the interfering signal 402 with such regularity that the interfering signals could cause significant interference to the impulse radio receiver.

However, when the transmitted impulse signal is encoded with the PN code dither (and the impulse radio receiver template signal 406 is synchronized with that identical PN code dither) the correlation samples the interfering signals pseudo-randomly. The samples from the interfering signal add incoherently, increasing roughly according to square root of the number of samples integrated; whereas, the impulse radio samples add coherently, increasing directly according to the number of samples integrated. Thus, integrating over many pulses overcomes the impact of interference.

Processing Gain

Impulse radio is resistant to interference because of its large processing gain. For typical spread spectrum systems, the definition of processing gain, which quantifies the decrease in channel interference when wide-band communications are used, is the ratio of the bandwidth of the channel to the bit rate of the information signal. For example, a direct sequence spread spectrum system with a 10 kHz information bandwidth and a 10 MHz channel bandwidth yields a processing gain of 1000 or 30 dB. However, far greater processing gains are achieved with impulse radio systems, where for the same 10 kHz information bandwidth is spread across a much greater 2 GHz. channel bandwidth, the theoretical processing gain is 200,000 or 53 dB.

Capacity

It has been shown theoretically, using signal to noise arguments, that thousands of simultaneous voice channels are available to an impulse radio system as a result of the exceptional processing gain, which is due to the exceptionally wide spreading bandwidth.

For a simplistic user distribution, with N interfering users of equal power equidistant from the receiver, the total interference signal to noise ratio as a result of these other users can be described by the following equation:

$$V_{tot}^2 = \frac{N\sigma^2}{\sqrt{Z}}$$

Where $V^2_{tot}$ is the total interference signal to noise ratio variance, at the receiver;

N is the number of interfering users;

$\sigma^2$ is the signal to noise ratio variance resulting from one of the interfering signals with a single pulse cross correlation; and Z is the number of pulses over which the receiver integrates to recover the modulation.

This relationship suggests that link quality degrades gradually as the number of simultaneous users increases. It also shows the advantage of integration gain. The number of users that can be supported at the same interference level increases by the square root of the number of pulses integrated.

Multipath and Propagation

One of the striking advantages of impulse radio is its resistance to multipath fading effects. Conventional narrow band systems are subject to multipath through the Rayleigh fading process, where the signals from many delayed reflections combine at the receiver antenna according to their seemingly random relative phases. This results in possible summation or possible cancellation, depending on the specific propagation to a given location. This situation occurs where the direct path signal is weak relative to the multipath signals, which represents a major portion of the potential coverage of a radio system. In mobile systems, this results in wild signal strength fluctuations as a function of distance traveled, where the changing mix of multipath signals results in signal strength fluctuations for every few feet of travel.

Impulse radios, however, can be substantially resistant to these effects. Impulses arriving from delayed multipath reflections typically arrive outside of the correlation time and thus can be ignored. This process is described in detail with reference to FIGS. 5A and 5B. In FIG. 5A, three propagation paths are shown. The direct path representing the straight line distance between the transmitter and receiver is the shortest. Path 1 represents a grazing multipath reflection, which is very close to the direct path. Path 2 represents a distant multipath reflection. Also shown are elliptical (or, in space, ellipsoidal) traces that represent other possible locations for reflections with the same time delay.

Figure 5B:
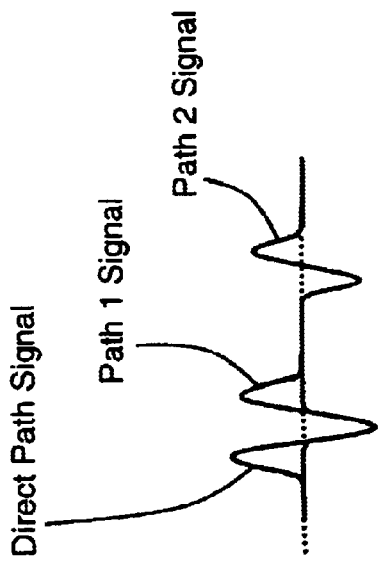
FIG. 5B illustrates exemplary multipath signals in the time domain.
Figure 5A:
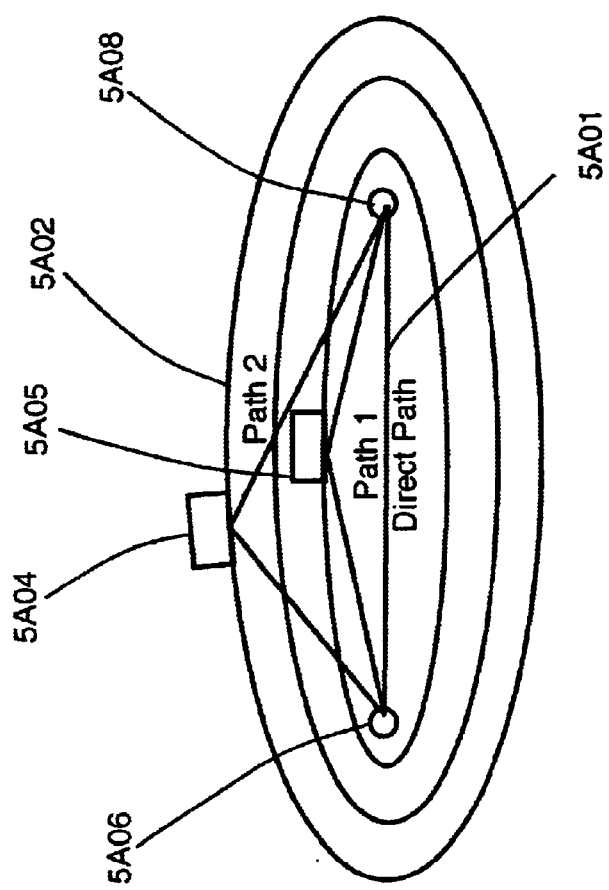
FIG. 5A illustrates a typical geometrical configuration giving rise to multipath received signals.

FIG. 5B represents a time domain plot of the received waveform from this multipath propagation configuration. This figure comprises three doublet pulses as shown in FIG. 1A. The direct path signal is the reference signal and represents the shortest propagation time. The path 1 signal is delayed slightly and actually overlaps and enhances the signal strength at this delay value. Note that the reflected waves are reversed in polarity. The path 2 signal is delayed sufficiently that the waveform is completely separated from the direct path signal. If the correlator template signal is positioned at the direct path signal, the path 2 signal will produce no response. It can be seen that only the multipath signals resulting from very close reflectors have any effect on the reception of the direct path signal. The multipath signals delayed less than one quarter wave (one quarter wave is about 1.5 inches, or 3.5 cm at 2 GHz center frequency) are the only multipath signals that can attenuate the direct path signal. This region is equivalent to the first Fresnel zone familiar to narrow band systems designers. Impulse radio, however, has no further nulls in the higher Fresnel zones. The ability to avoid the highly variable attenuation from multipath gives impulse radio significant performance advantages.

FIG. 5A illustrates a typical multipath situation, such as in a building, where there are many reflectors 5A04, 5A05 and multiple propagation paths 5A02, 5A01. In this figure, a transmitter TX 5A06 transmits a signal which propagates along the multiple propagation paths 5A02, 5A04 to receiver RX 5A08, where the multiple reflected signals are combined at the antenna.

FIG. 5B illustrates a resulting typical received composite pulse waveform resulting from the multiple reflections and multiple propagation paths 5A01, 5A02. In this figure, the direct path signal 5A01 is shown as the first pulse signal received. The multiple reflected signals ("multipath signals", or "multipath") comprise the remaining response as illustrated.

Figure 5C:
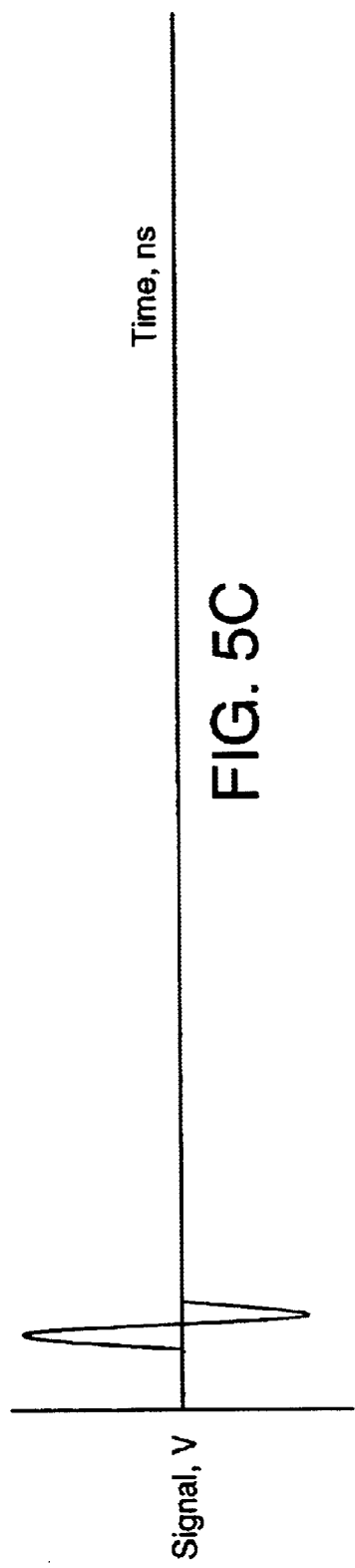
FIGS. 5C–5E illustrate a signal plot of various multipath environments.
Figure 5D:
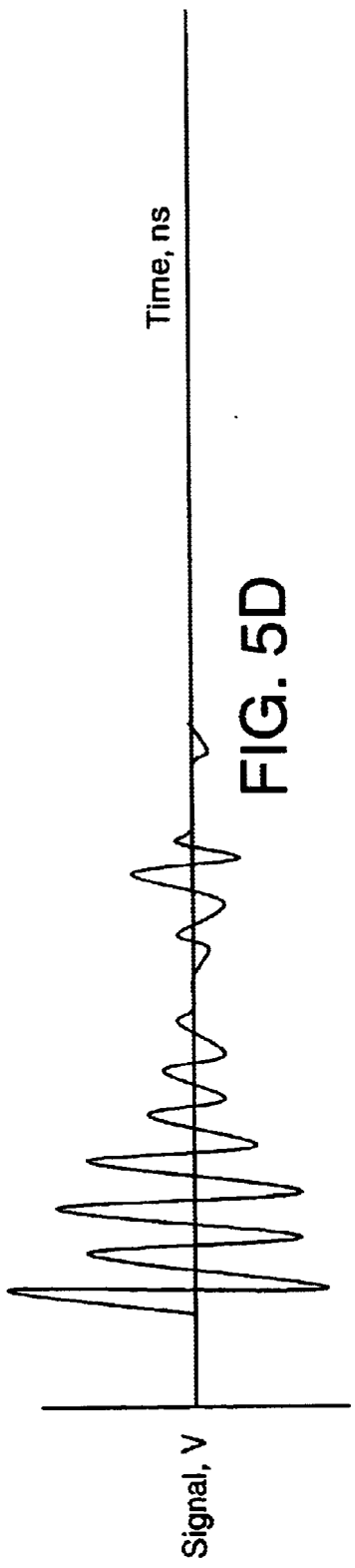
Figure 5E:
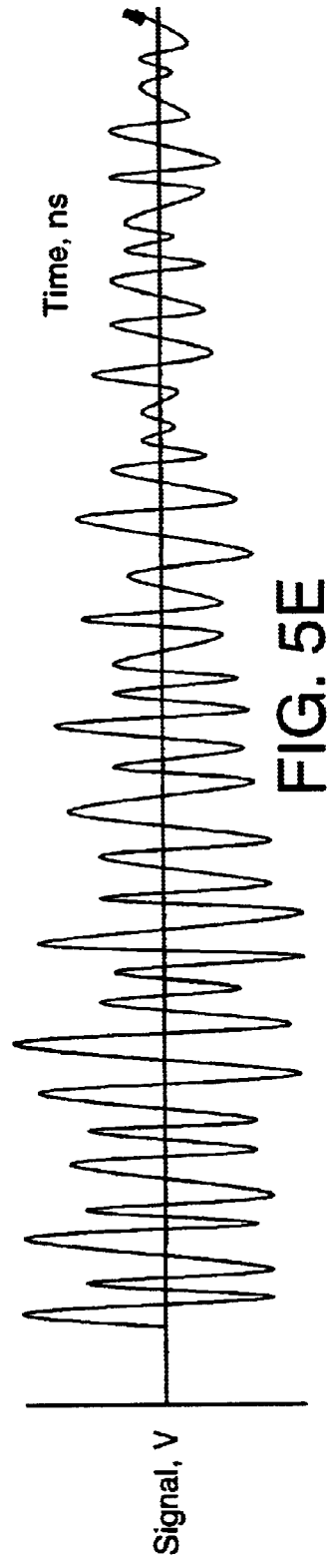

FIGS. 5C, 5D, and 5E represent the received signal from a TM-UWB transmitter in three different multipath environments. These figures are not actual signal plots, but are hand drawn plots approximating typical signal plots. FIG. 5C illustrates the received signal in a very low multipath environment. This may occur in a building where the receiver antenna is in the middle of a room and is one meter from the transmitter. This may also represent signals received from some distance, such as 100 meters, in an open field where there are no objects to produce reflections. In this situation, the predominant pulse is the first received pulse and the multipath reflections are too weak to be significant. FIG. 5D illustrates an intermediate multipath environment. This approximates the response from one room to the next in a building. The amplitude of the direct path signal is less than in FIG. 5C and several reflected signals are of significant amplitude. (Note that the scale has been increased to normalize the plot.) FIG. 5E approximates the response in a severe multipath environment such as: propagation through many rooms; from corner to corner in a building; within a metal cargo hold of a ship; within a metal truck trailer; or within an intermodal shipping container. In this scenario, the main path signal is weaker than in FIG. 5D. (Note that the scale has been increased again to normalize the plot.) In this situation, the direct path signal power is small relative to the total signal power from the reflections.

An impulse radio receiver in accordance with the present invention can receive the signal and demodulate the information using either the direct path signal or any multipath signal peak having sufficient signal to noise ratio. Thus, the impulse radio receiver can select the strongest response from among the many arriving signals. In order for the signals to cancel and produce a null at a given location, dozens of reflections would have to be canceled simultaneously and precisely while blocking the direct path—a highly unlikely scenario. This time separation of multipath signals together with time resolution and selection by the receiver permit a type of time diversity that virtually eliminates cancellation of the signal. In a multiple correlator rake receiver, performance is further improved by collecting the signal power from multiple signal peaks for additional signal to noise performance.

Where the system of FIG. 5A is a narrow band system and the delays are small relative to the data bit time, the received signal is a sum of a large number of sine waves of random amplitude and phase. In the idealized limit, the resulting envelope amplitude has been shown to follow a Rayleigh probability distribution as follows:

$$p(r) = \frac{r}{\sigma^2} \exp\left(\frac{-r^2}{2\sigma^2}\right)$$

where r is the envelope amplitude of the combined multipath signals, and $\sqrt{2}\,\sigma$ is the RMS amplitude of the combined multipath signals.

Figure 5F:
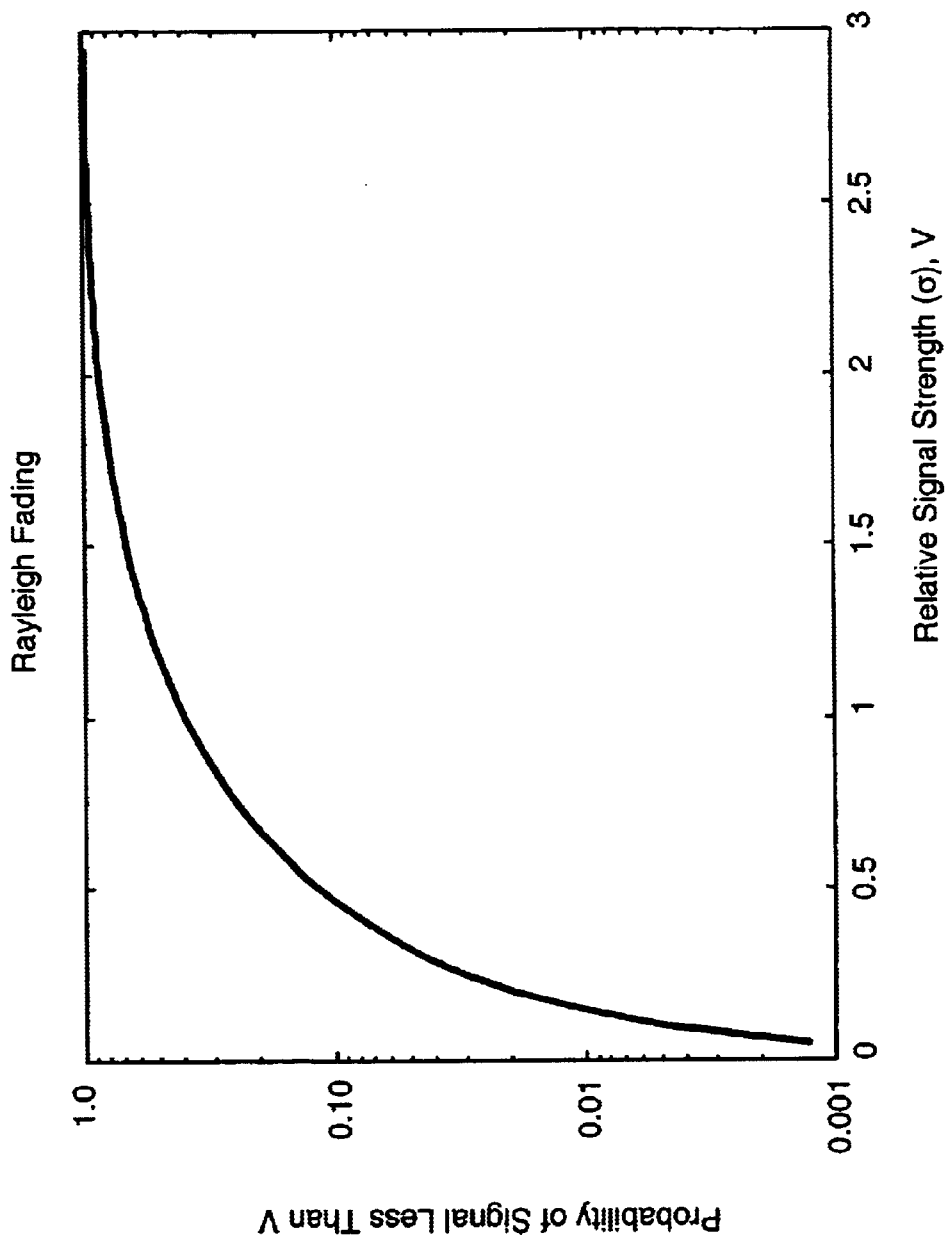
FIG. 5F illustrates the Rayleigh fading curve associated with non-impulse radio transmissions in a multipath environment.

This distribution shown in FIG. 5F. It can be seen in FIG. 5F that 10% of the time, the signal is more than 10 dB attenuated. This suggests that 10 dB fade margin is needed to provide 90% link availability. Values of fade margin from 10 to 40 dB have been suggested for various narrow band systems, depending on the required reliability. This characteristic has been the subject of much research and can be partially improved by such techniques as antenna and frequency diversity, but these techniques result in additional complexity and cost.

Figures 5G, 5H:
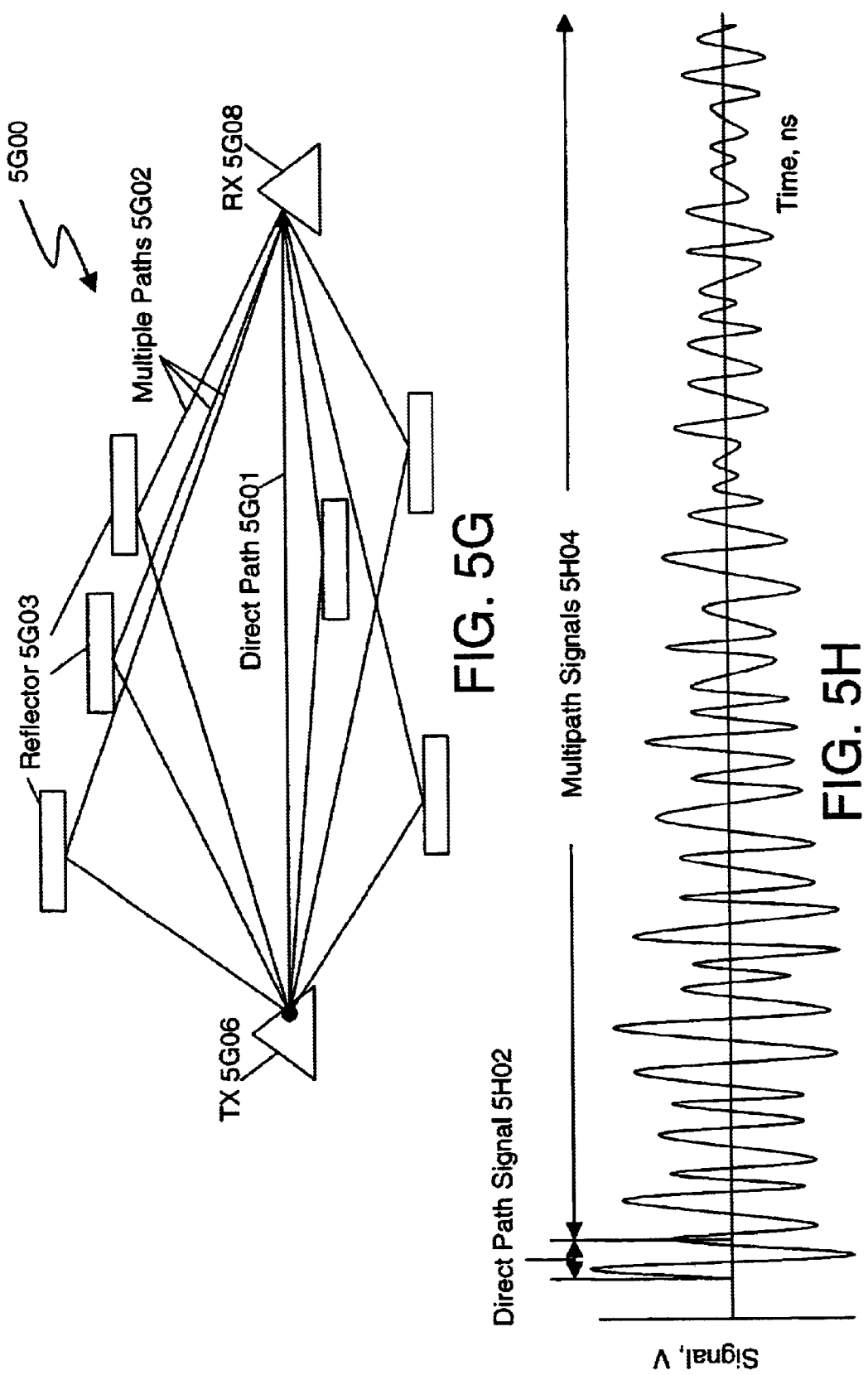
FIG. 5G illustrates a plurality of multipaths with a plurality of reflectors from a transmitter to a receiver.
FIG. 5H graphically represents signal strength as volts vs. time in a direct path and multipath environment.

In a high multipath environment such as inside homes, offices, warehouses, automobiles, trailers, shipping containers, or outside in the urban canyon or other situations where the propagation is such that the received signal is primarily scattered energy, impulse radio, according to the present invention, can avoid the Rayleigh fading mechanism that limits performance of narrow band systems. This is illustrated in FIGS. 5G and 5H in a transmit and receive system in a high multipath environment 5G00, wherein the transmitter 5G06 transmits to receiver 5G08 with the signals reflecting off reflectors 5G03 which form multipaths 5G02. The direct path is illustrated as 5G01 with the signal graphically illustrated at 5H02 with the vertical axis being the signal strength in volts and horizontal axis representing time in nanoseconds. Multipath signals are graphically illustrated at 5H04.

Distance Measurement and Position Location

Impulse systems can measure distances to extremely fine resolution because of the absence of ambiguous cycles in the waveform. Narrow band systems, on the other hand, are limited to the modulation envelope and cannot easily distinguish precisely which RF cycle is associated with each data bit because the cycle-to-cycle amplitude differences are so small they are masked by link or system noise. Since the impulse radio waveform has no multi-cycle ambiguity, this allows positive determination of the waveform position to less than a wavelength—potentially, down to the noise floor of the system. This time position measurement can be used to measure propagation delay to determine link distance, and once link distance is known, to transfer a time reference to an equivalently high degree of precision. The inventors of the present invention have built systems that have shown the potential for centimeter distance resolution, which is equivalent to about 30 ps of time transfer resolution. See, for example, commonly owned, co-pending applications Ser. No. 09/045,929, filed Mar. 23, 1998, titled "Ultrawide-Band Position Determination System and Method", and Ser. No. 09/083,993, filed May 26, 1998, titled "System and Method for Distance Measurement by Inphase and Quadrature Signals in a Radio System", both of which are incorporated herein by reference. Finally, distance measuring and position location using impulse radio using a plurality of distance architectures is enabled in co-pending and commonly owned U.S. patent application Ser. No. 09/456,409, filed Dec. 8, 1999, titled, "System and Method for Person or Object Position Location Utilizing Impulse Radio."

Exemplary Transceiver Implementation

Transmitter

An exemplary embodiment of an impulse radio transmitter 602 of an impulse radio communication system having one subcarrier channel will now be described with reference to FIG. 6.

The transmitter 602 comprises a time base 604 that generates a periodic timing signal 606. The time base 604 typically comprises a voltage controlled oscillator (VCO), or the like, having a high timing accuracy and low jitter, on the order of picoseconds (ps). The voltage control to adjust the VCO center frequency is set at calibration to the desired center frequency used to define the transmitter's nominal pulse repetition rate. The periodic timing signal 606 is supplied to a precision timing generator 608.

The precision timing generator 608 supplies synchronizing signals 610 to the code source 612 and utilizes the code source output 614 together with an internally generated subcarrier signal (which is optional) and an information signal 616 to generate a modulated, coded timing signal 618.

The code source 612 comprises a storage device such as a random access memory (RAM), read only memory (ROM), or the like, for storing suitable PN codes and for outputting the PN codes as a code signal 614. Alternatively, maximum length shift registers or other computational means can be used to generate the PN codes.

An information source 620 supplies the information signal 616 to the precision timing generator 608. The information signal 616 can be any type of intelligence, including digital bits representing voice, data, imagery, or the like, analog signals, or complex signals.

A pulse generator 622 uses the modulated, coded timing signal 618 as a trigger to generate output pulses. The output pulses are sent to a transmit antenna 624 via a transmission line 626 coupled thereto. The output pulses are converted into propagating electromagnetic pulses by the transmit antenna 624. In the present embodiment, the electromagnetic pulses are called the emitted signal, and propagate to an impulse radio receiver 702, such as shown in FIG. 7, through a propagation medium, such as air, in a radio frequency embodiment. In a preferred embodiment, the emitted signal is wide-band or ultrawide-band, approaching a monocycle pulse as in FIG. 1A. However, the emitted signal can be spectrally modified by filtering of the pulses. This filtering will usually cause each monocycle pulse to have more zero crossings (more cycles) in the time domain. In this case, the impulse radio receiver can, use a similar waveform as the template signal in the cross correlator for efficient conversion.

Receiver

An exemplary embodiment of an impulse radio receiver 702 (hereinafter called the receiver) for the impulse radio communication system is now described with reference to FIG. 7. More specifically, the system illustrated in FIG. 7 is for reception of digital data wherein one or more pulses are transmitted for each data bit.

The receiver 702 comprises a receive antenna 704 for receiving a propagated impulse radio signal 706. A received signal 708 from the receive antenna 704 is coupled to a cross correlator or sampler 710 to produce a baseband output 712. The cross correlator or sampler 710 includes multiply and integrate functions together with any necessary filters to optimize signal to noise ratio.

The receiver 702 also includes a precision timing generator 714, which receives a periodic timing signal 716 from a receiver time base 718. This time base 718 is adjustable and controllable in time, frequency, or phase, as required by the lock loop in order to lock on the received signal 708. The precision timing generator 714 provides synchronizing signals 720 to the code source 722 and receives a code control signal 724 from the code source 722. The precision timing generator 714 utilizes the periodic timing signal 716 and code control signal 724 to produce a coded timing signal 726. The template generator 728 is triggered by this coded timing signal 726 and produces a train of template signal pulses 730 ideally having waveforms substantially equivalent to each pulse of the received signal 708. The code for receiving a given signal is the same code utilized by the originating transmitter 602 to generate the propagated signal 706. Thus, the timing of the template pulse train 730 matches the timing of the received signal pulse train 708, allowing the received signal 708 to be synchronously sampled in the correlator 710. The correlator 710 ideally comprises a multiplier followed by a short term integrator to sum the multiplier product over the pulse interval. Further examples and details of correlation and sampling processes can be found in commonly owned U.S. Pat. Nos. 4,641,317, 4,743,906, 4,813,057 and 4,979,186 which are incorporated herein by reference, and commonly owned and co-pending application Ser. No. 09/356,384, filed Jul. 16, 1999, titled: "Baseband Signal Converter Device for a Wideband Impulse Radio Receiver," which is incorporated herein by reference.

The output of the correlator 710, also called a baseband signal 712, is coupled to a subcarrier demodulator 732, which demodulates the subcarrier information signal from the subcarrier. The purpose of the optional subcarrier process, when used, is to move the information signal away from DC (zero frequency) to improve immunity to low frequency noise and offsets. The output of the subcarrier demodulator 732 is then filtered or integrated in a pulse summation stage 734. The pulse summation stage produces an output representative of the sum of a number of pulse signals comprising a single data bit. The output of the pulse summation stage 734 is then compared with a nominal zero (or reference) signal output in a detector stage 738 to determine an output signal 739 representing an estimate of the original information signal 616.

The baseband signal 712 is also input to a lowpass filter 742 (also referred to as lock loop filter 742). A control loop comprising the lowpass filter 742, time base 718, precision timing generator 714, template generator 728, and correlator 710 is used to generate a filtered error signal 744. The filtered error signal 744 provides adjustments to the adjustable time base 718 to time position the periodic timing signal 726 in relation to the position of the received signal 708.

In a transceiver embodiment, substantial economy can be achieved by sharing part or all of several of the functions of the transmitter 602 and receiver 702. Some of these include the time base 718, precision timing generator 714, code source 722, antenna 704, and the like.

FIGS. 8A–8C illustrate the cross correlation process and the correlation function. FIG. 8A shows the waveform of a template signal. FIG. 8B shows the waveform of a received impulse radio signal at a set of several possible time offsets. FIG. 8C represents the output of the correlator (multiplier and short time integrator) for each of the time offsets of FIG. 8B. Thus, this graph, FIG. 8C, does not show a waveform that is a function of time, but rather a function of time-offset, i.e., for any given pulse received, there is only one corresponding point which is applicable on this graph. This is the point corresponding to the time offset of the template signal used to receive that pulse.

Further examples and details of subcarrier processes and precision timing can be found described in U.S. Pat. No. 5,677,927, titled "An Ultrawide-Band Communications System and Method", and commonly owned co-pending application Ser. No. 09/146,524, filed Sep. 3, 1998, titled "Precision Timing Generator System and Method", both of which are incorporated herein by reference.

Impulse Radio as Used in the Present Invention

When utilized in a radio communication network, the characteristics of impulse radio significantly improve the state of the art. In order to fully realize the benefits of impulse radio communication, it is necessary that an agile and dependable timing apparatus be employed so that synchrony within the network may be quickly acquired and reliably maintained.

DETAILED DESCRIPTION OF THE
PREFERRED EMBODIMENT

Applications involving transmitting or receiving time modulated ultrawideband pulses must be able to generate precise timing signals for triggering pulse-generating circuits. Such precision pulse-generating circuits are employed for transmitting and for receiver correlation circuits in such time modulated ultrawideband systems as, for example, impulse radio systems employed for communications, radar, positioning and other applications.

Typically, timing circuits generate timing signals at a nominal frequency known as the pulse repetition frequency (PRF). The PRF has a corresponding period known as the pulse repetition period (PRP). The PRP is also commonly referred to as a frame. Modulation of the phase of the timing signals during respective frames can be used to smooth the frequency spectrum involved in the transmission, to modulate data to be conveyed by the system, and to provide channelization (i.e., a capability to distinguish among individual transmitters). Further, adding a constant phase change at a periodic rate allows one to alter the nominal PRF. It is this ability to alter the PRF of a timing signal that enables one to effect channel synchronization (acquisition) and maintenance of synchronization to overcome oscillator mismatch and motion correction (tracking).

Earlier, prior art methods for providing synchrony in such systems have involved varying input to a voltage-controlled oscillator (VCO) to control the frame frequency. In such an arrangement, the frame frequency of a system—but not its phase—may be changed. Such a VCO-controlled approach, however, effects frequency changes too slowly and too unpredictably to reliably support operations involving time modulated ultrawideband pulse systems.

The apparatus and method of the present invention provides single frame timing with a fixed PRP that can be loaded with a frame offset (phase) value in multiple locations within the span of a frame. The apparatus of the present invention is a circuit that operates with the single frame timing to form a multiframe timing system that can modulate both PRF and phase.

Figure 9:
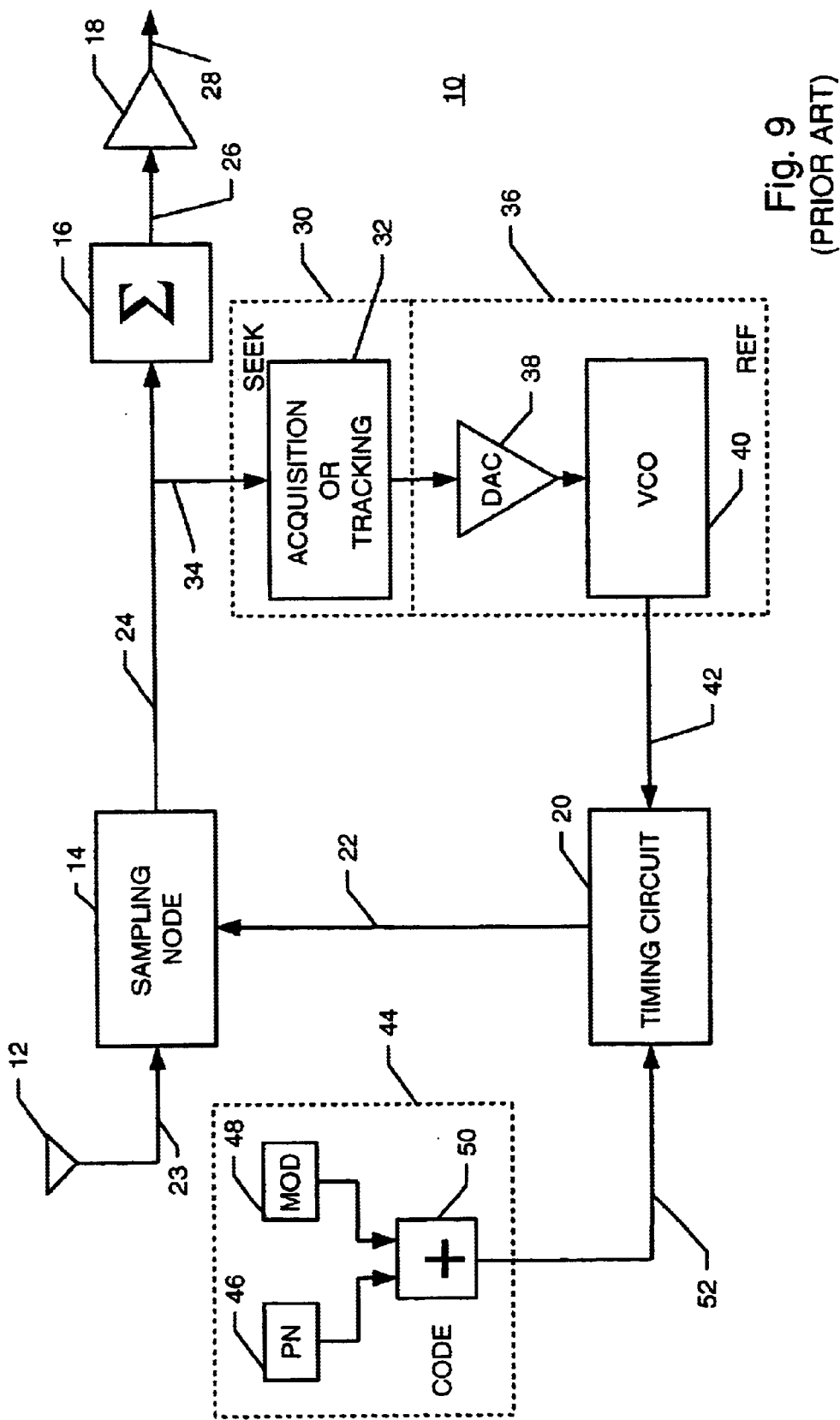
FIG. 9 is a schematic diagram of a prior art synchronizing circuit for wireless communications.

FIG. 9 is a schematic diagram of a prior art synchronizing circuit for wireless communications. In FIG. 9, an impulse radio receiver system 10 includes a receiving antenna 12, a sampling node 14, an integrator 16 and an amplifier 18. Sampling node 14 contains a template relating to a predetermined encoding scheme, such as a pseudorandom encoding scheme. A timing circuit 20 provides a trigger signal on a line 22 to sampling node 14 to activate sampling node 14 for sampling signals received via a line 23. By such periodic sampling, sampling node 14 may indicate the presence or absence of correlation between encoded signals received via line 23 and the template in sampling node 14 relating to the predetermined encoding scheme. Such correlation indicates synchrony between system 10 and signals received via line 23. The trigger signal provided by timing circuit 20 cooperates with signals received by antenna 12 and provided to sampling node 14 via line 23 to produce detection indication signals (i.e., signals relating to presence or absence of correlation) on a line 24. The detection indication signals are delivered via line 24 to integrator 16. Integrator 16 integrates the detection indication signals over time and delivers integrated detection indication signals via a line 26 to amplifier 18. Amplifier 18 amplifies the integrated detection indication signals and provides amplified integrated detection indication signals to an impulse radio device (not shown) via an output line 28.

A seek unit 30 includes a tracking or acquisition device 32. Acquisition or tracking device 32 receives detection indication signals from line 24 via a line 34. Acquisition or tracking device 32 evaluates the detection indication signals to determine whether system 10 is in synchrony with transmitted signals received at antenna 12, or whether such synchrony is yet to be established. If synchrony is yet to be established, acquisition or tracking device 32 will impose a seeking slide, or search variance to be applied to trigger signals carried on line 22 to advance or retard timing of the timing signals. Such advancing or retarding is carried out to seek synchrony between system 10 and received signals provided from antenna 12 to sampling node 14 via line 23 by varying the timing signals carried via line 22. If synchrony is established, acquisition or tracking device 32 will impose a tracking slide, or search variance to be applied to trigger signals carried on line 22 to advance or retard timing of the timing signals. Such advancing or retarding is carried out to seek synchrony between the timing signals carried via line 22 and received signals provided from antenna 12 to sampling node 14 via line 23. Preferably the tracking slide variance is less than the seeking slide variance.

The detection indication signals, with an appropriate slide variance applied, are provided from acquisition or tracking device 32 to a reference device 36. Reference device 36 includes a digital-to-analog converter (DAC) 38 and a voltage-controlled oscillator (VCO) 40. DAC 38 receives the detection indication signals, with an appropriate slide variance applied, in digital form and converts those digital signals to an analog variance indication signal. DAC 38 provides the analog variance indication signal to VCO 40 as a control signal affecting the input voltage to VCO 40. Thus, the analog variance indication signals received by VCO 40 from DAC 38 control the output of VCO 40. Reference device 36 provides the output of VCO 40 on a line 42 as an input to timing circuit 20. The output of reference device 36 is a timing signal having a pulse repetition frequency (PRF) that may vary from frame to frame. Variance of the timing signal on line 42 reflects the attempts by the seek unit to match the frequency of signals received by antenna 12. A coding unit 44 includes a pseudorandom number (PN) generator device 46 and a modulation coding device 48. PN generator device 46 provides a PN code offset value to a combining node 50; modulation coding device 48 provides a modulation code offset value to combining node 50. Combining node 50 combines the PN code offset value received from PN generator device 46 and the modulation code offset received from modulation coding device 48 to provide a frame offset value via a line 52 to timing circuit 20. Timing circuit 20 incorporates the frame offset value receive via line 52 with the timing signal received via line 42 to produce the trigger signal provided via line 22 to sampling node 14.

Another factor is also taken into account in the prior art timing circuit illustrated in FIG. 9. There is a settling time associated with the loading of the frame offset value, preferably during each succeeding frame. The settling time results in a "dead zone" following the start of each frame during which entry of any information is very unreliable. Accordingly, a delay to forego the "dead zone" effects is at least a portion of the factors taken into account in determining the variance to be applied to the input of the VCO in establishing when to start a new frame in the timing signal provided via line 42 to timing circuit 20. The choice of starting time for the frame affects the PRF of the timing signal.

Figure 10:
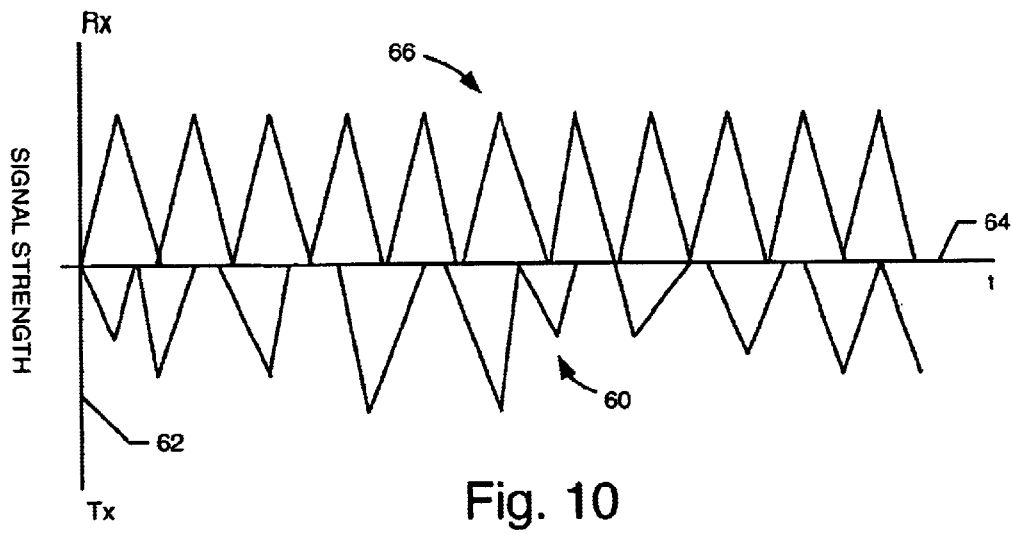
FIG. 10 is a schematic representation of correlation of a receiver signal with a received transmitted signal.

FIG. 10 is a schematic representation of correlation of a receiver signal with a received transmitted signal. In FIG. 10, a received transmit signal 60 (as, for example, received at antenna 12 of system 10; FIG. 9) is schematically represented in a plot containing an axis 62 indicating signal strength and an axis 64 indicating time (t). A receiver trigger signal 66 is also schematically represented in a plot containing the same axes 62, 64. In the example of FIG. 10, received transmit signal 60 deviates in a negative direction from axis 64 to indicate greater signal strength, and receiver trigger signal 66 deviates in a positive direction from axis 62 to indicate greater signal strength. Other modes of recording respective signals may be employed, but this simple arrangement of opposite polarities of deviation is preferred for indicating respective signal strengths of signals 60, 66 because it simplifies algebraically combining signals 60, 66 to ascertain time-coincidence of high signal strength of signals 60, 66. Time-coincidence of signals 60, 66 indicates correlation of signals 60, 66. When received transmit signal 60 is structured having a predetermined pulse repetition frequency (PRF) and contains modulation according to predetermined coding schemes (e.g., a pseudorandum number code and a modulation code), correlation is required to glean intelligence contained in the received transmitted signal. The timing circuit seeks to attain such correlation (acquisition) and to maintain such correlation once it is attained (tracking).

Figure 11:
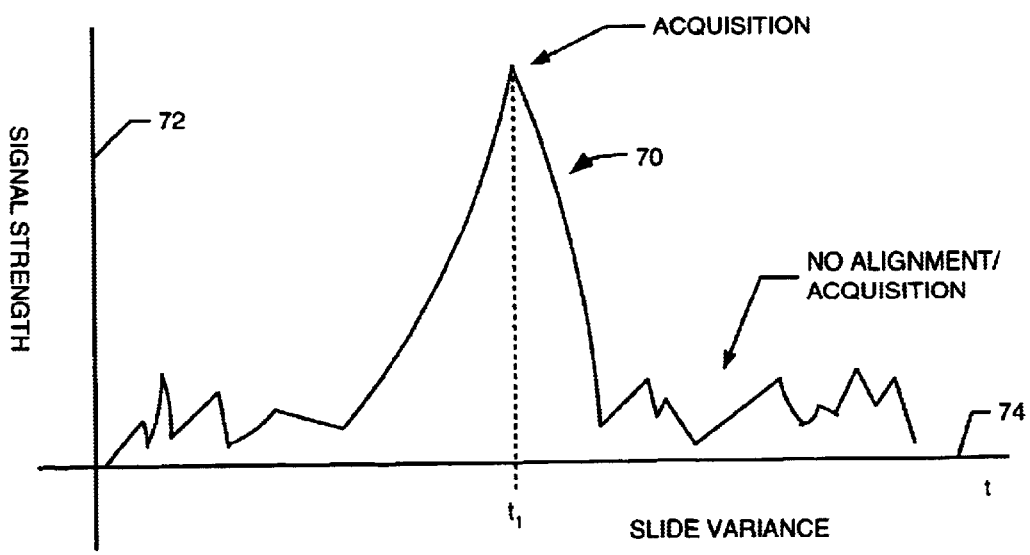
FIG. 11 is a schematic representation of a detection indication signal.

FIG. 11 is a schematic representation of a detection indication signal. In FIG. 11, a detection indication signal 70 comprising an algebraic combination of two component signals: (1) a received transmitted signal (such as signal 60; FIG. 10), and (2) a receiver trigger signal (such as signal 66; FIG. 10). Detection indication signal 70 is plotted with respect to an axis 72 representing signal strength and an axis 74 representing time (t). When the two component signals comprising detection indication signal 70 are time-coincident they are peaking at the same time and are opposite in their polarity. A simple algebraic subtraction of one signal from another signal yields an indication of the time-relation of the two signals and their respective values. Thus, when a receiver trigger signal and a received transmitted signal peak at the same time, as at $t=t_1$ in FIG. 11, the detection indication signal 70 peaks. At other loci where the respective signals are not time-coincident in their respective peak values, there is a partial cancellation of the algebraic combination of the signals and no peak value of detection indication signal 70 occurs. A trigger signal (such as the trigger signal provided on line 22; FIG. 9) that commences its frame at a proper time and that properly incorporates a frame offset based upon a PN code offset and a modulation code offset, will align with a received transmitted signal having the same frame structure and encoded using the same coding scheme (such as the received transmitted signal provided on line 23; FIG. 9). A result of such alignment is correlation of the signals, indicated by a set of peaks such as the peak illustrated in FIG. 11. Such correlation allows intelligent reception of a received transmitted signal in a manner enabling understanding of the intelligence conveyed and encoded by the received transmitted signal.

Figure 12:
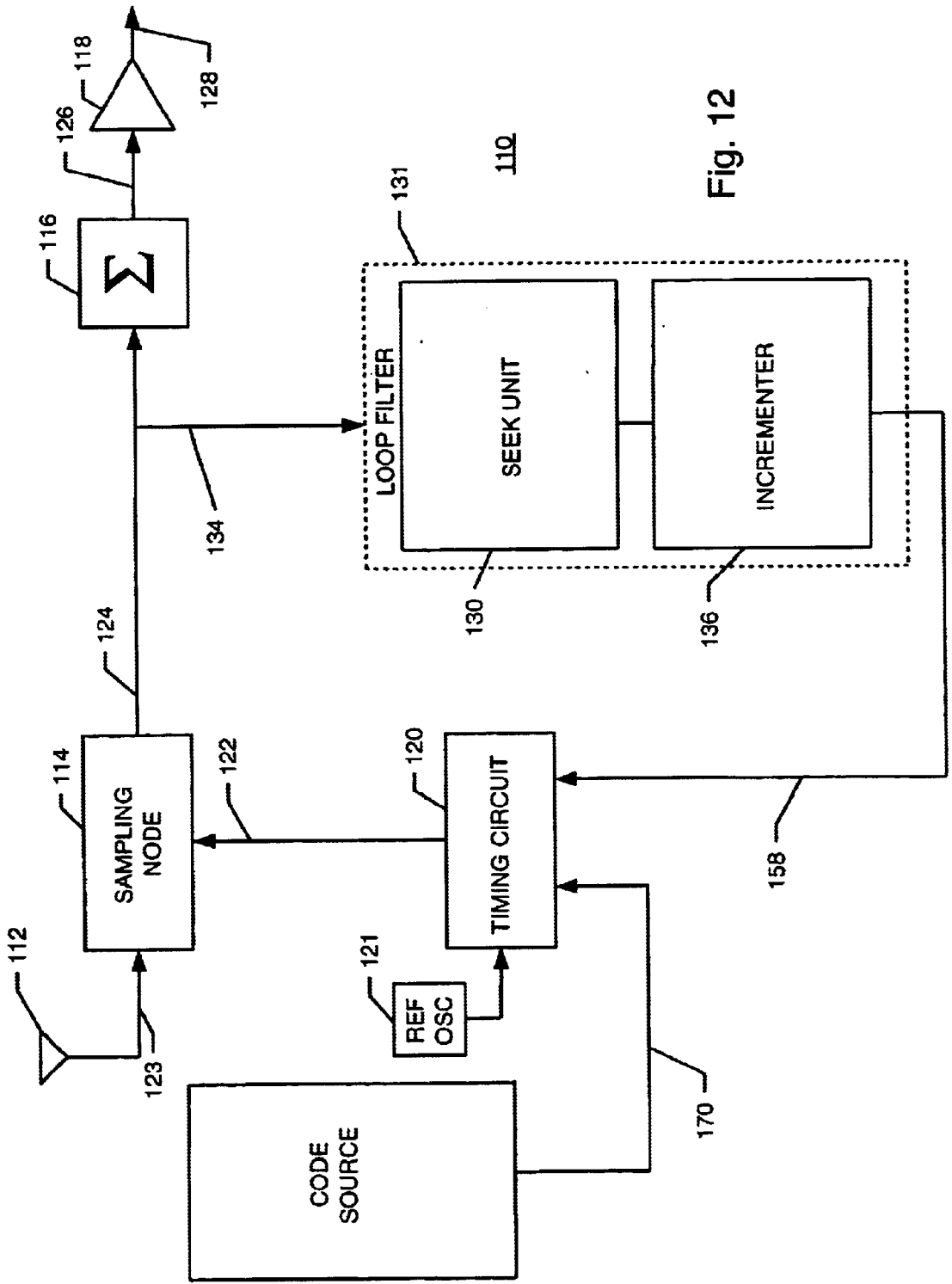
FIG. 12 is a simple schematic diagram of the preferred embodiment of the apparatus of the present invention.

FIG. 12 is a schematic diagram of the preferred embodiment of the apparatus of the present invention. In FIG. 12, an impulse radio receiving system 110 includes a receiving antenna 112, a sampling node 114, an integrator 116 and an amplifier 118. Sampling node 114 contains a template relating to a predetermined encoding scheme, such as a pseudorandom encoding scheme. A timing circuit 120 provides a trigger signal on a line 122 to sampling node 114 to activate sampling node 114 for sampling signals received via a line 123. By such periodic sampling, sampling node 114 may indicate the presence or absence of correlation between encoded signals received via line 123 and the template in sampling node 114 relating to the predetermined encoding scheme. Such correlation indicates synchrony between system 110 and signals received via line 123. The trigger signal provided by timing circuit 120 cooperates with signals received by antenna 112 and provided to sampling node 114 via line 123 to produce detection indication signals (i.e., signals relating to presence or absence of correlation) on a line 124.

Timing circuit 120 receives a reference clock signal a reference oscillator 121. The detection indication signals are delivered via line 124 to integrator 116. Integrator 116 integrates the detection indication signals over time and delivers integrated detection indication signals via a line 126 to amplifier 118. Amplifier 118 amplifies the integrated detection indication signals and provides amplified integrated detection indication signals to an impulse radio device (not shown) via an output line 128.

A loop filter 131 includes a seek unit 130 and an incrementer, or offset unit 136. Loop filter 131 receives detection indication signals from line 124 via a line 134 and evaluates the detection indication signals to determine whether system 110 is in synchrony with transmitted signals received at antenna 112. Loop filter 131 imposes a variance via a line 158 to timing circuit 120, and timing circuit 120 will applies a variance to trigger signals carried on line 122, to advance or retard timing of the timing signals. Such advancing or retarding is carried out to seek or maintain synchrony between system 110 and received signals provided from antenna 112 to sampling node 114 via line 123 by varying the timing signals carried via line 122.

Figure 13:
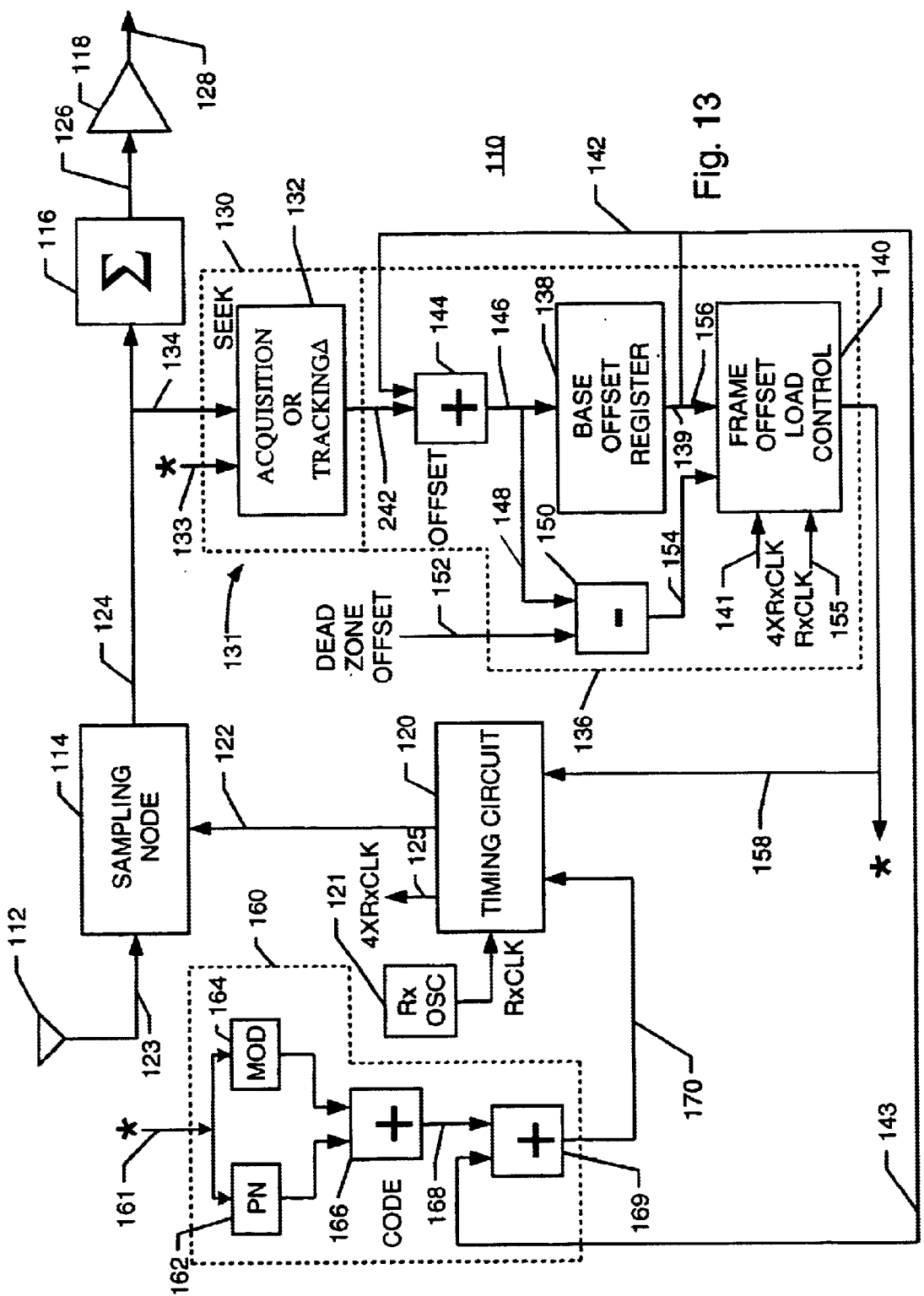
FIG. 13 is a more detailed schematic diagram of the preferred embodiment of the apparatus of the present invention illustrated in FIG. 12.

FIG. 13 is a more detailed schematic diagram of the preferred embodiment of the apparatus of the present invention illustrated in FIG. 12. In FIG. 13, impulse radio receiving system 110 includes receiving antenna 112, sampling node 114, integrator 116 and amplifier 118. Sampling node 114 contains a template relating to a predetermined encoding scheme, such as a pseudorandom encoding scheme. Timing circuit 120 provides a trigger signal on line 122 to sampling node 114 to activate sampling node 114 for sampling signals received via line 123. By such periodic sampling, sampling node 114 may indicate the presence or absence of correlation between encoded signals received via line 123 and the template in sampling node 114 relating to the predetermined encoding scheme. Such correlation indicates synchrony between system 110 and signals received via line 123. The trigger signal provided by timing circuit 120 cooperates with signals received by antenna 112 and provided to sampling node 114 via line 123 to produce detection indication signals (i.e., signals relating to presence or absence of correlation) on line 124.

Timing circuit 120 receives a constant frequency receiver reference clock signal RxCLK having a frequency ($f_{Rx}$) from receiver oscillator 121. Timing circuit 120 further generates a reference signal at an output 125 that is preferably an integer, "n", times the frequency of the signal received from receiver oscillator 121. Thus, the reference clock signal presented at output 125 has a frequency of ($n \times f_{Rx}$). In the preferred embodiment of the present invention illustrated in FIG. 13, the reference clock signal presented at output 125 is reference clock signal 4×RxCLK having a frequency of ($4 \times f_{Rx}$), but other values of "n" may be employed as well.

The detection indication signals are delivered via line 124 to integrator 116. Integrator 116 integrates the detection indication signals over time and delivers integrated detection indication signals via a line 126 to amplifier 118. Amplifier 118 amplifies the integrated detection indication signals and provides amplified integrated detection indication signals to an impulse radio device (not shown) via an output line 128.

Loop filter 131 includes a seek unit 130 and an incrementer, or offset device 136. Seek unit 130 includes an acquisition or tracking device 132. Acquisition or tracking device 132 receives detection indication signals from line 124 via line 134. Acquisition or tracking device 132 evaluates the detection indication signals to determine whether system 110 is in synchrony with transmitted signals received at antenna 112, or whether such synchrony is yet to be established. If synchrony is yet to be established, acquisition or tracking device 132 will impose a seeking slide, or search variance to be applied to trigger signals carried on line 122 to advance or retard timing of the timing signals. Such advancing or retarding is carried out to seek synchrony between system 110 and received signals provided from antenna 112 to sampling node 114 via line 123 by varying the timing signals carried via line 122. If synchrony is established, acquisition or tracking device 132 will impose a tracking slide, or search variance to be applied to trigger signals carried on line 122 to advance or retard timing of the timing signals. Such advancing or retarding is carried out to seek synchrony between the timing signals carried via line 122 and received signals provided from antenna 112 to sampling node 114 via line 123. Preferably the tracking slide variance is less than the seeking slide variance.

The detection indication signals, with an appropriate slide variance applied, are provided from acquisition or tracking device 132 to offset device 136, as indicated by a line 242. Offset device 136 includes a base offset register 138 and a frame offset load control unit 140. The base offset is an indicator relating to the difference in frame period between the frame structure of the received transmitted signal (provided from antenna 112 to sampling node 114 via line 123) and the frame structure of a constant frequency receiver reference clock signal RxCLK provided by receiver oscillator 121. Preferably the base offset reflects the time difference between symmetrical loci of the two signals, such as the occurrence of a downward departing excursion of each of the respective signals.

Base offset register 138 provides an output signal on an output line 139 indicating, frame-by-frame, the base offset of the signal comparison for the last frame processed. The base offset value is preferably entered into base offset register 138 as a number indicating a time at which the received transmitted signal (provided from antenna 112 to sampling node 114 via line 123) will next downwardly depart following a downward departure of the constant frequency receiver reference clock signal RxCLK provided by receiver oscillator 121. The base offset value is provided via a feedback line 142 as an input to a combining unit 144. Combining unit 144 also receives the detection indication signals, with an appropriate slide variance applied, from seek unit 130. Combining unit 144 provides an output signal to base offset register 138 on a line 146 that represents the last base offset with an accounting for the desired seeking or tracking variance imposed by acquisition or tracking device 132. The output signal carried on line 146 is also provided via a line 148 to a combining unit 150. Combining unit 150 also receives a signal via a line 152 that accounts for the "dead zone" that precludes reliable device utilization for a short period following frame offset indication loading. As mentioned hereinbefore, such "dead zone" intervals arise from settling times required by certain components, such as comparators and like components, employed in the circuitry of the present invention. In the preferred embodiment of the present invention, the interval represented by the signal provided to combining unit 150 via line 152 represents a constant offset to account for "dead zones". Combining unit 150 provides a signal representative of the last base offset with an accounting for the desired seeking or tracking variance imposed by acquisition or tracking device 132, plus an allowance for a "dead zone", via a line 154 to frame offset load control unit 140. Frame offset load control unit 140 receives the base offset value via a line 156. Frame offset load control unit 140 also receives reference clock signal 4xRxCLK at an input 141 and receives reference clock signal RxCLK at an input 155.

Frame offset load control unit 140 operates to control assertion of frame offset load signals in order to establish a frame offset appropriate to commence a "virtual frame" as close as systemically possible to the beginning of a received transmitted signal "frame at hand" as can be accomplished without having a "dead zone" following the ordered frame offset assertion overlap the "frame at hand". The "frame at hand" is the next succeeding frame of the received transmitted signal that will occur following a given instant in time.

Frame offset load control unit 140 selectively asserts a frame offset load (FOL) signal to effect commencing a virtual frame preferably employing a state machine (FIG. 16), or other appropriate device. The commencement of a virtual frame is signaled by a virtual frame commencement indicator signal via a line 158 to timing circuit 120. The virtual frame commencement indicator signal participates in directing timing circuit 120 to produce a trigger signal on line 122.

The virtual frame commencement indicator signal is also provided by frame offset load control unit 140 to acquisition or tracking unit 132 at an input 133, and to a coding offset unit 160 at an input 161. Acquisition or tracking unit 132 and coding offset unit 160 employ the virtual frame commencement indicator signal received from frame offset load control unit 140 as a reiteration signal indicating that a new virtual frame is commencing, and the operation of system 110 described herein with respect to FIG. 13 is imminently to be repeated.

Coding offset unit 160 includes a pseudorandom number (PN) code offset generator 162 and a modulation code offset generator 164. PN code offset generator 162 provides a PN code offset value to a combining node 166; modulation code offset generator 164 provides a modulation code offset value to combining node 166. Combining node 166 combines the PN code offset value received from PN code offset generator 162 and the modulation code offset received from modulation code offset generator 164 to provide an initial code offset value via a line 168 to a combining node 169. Combining node 169 also receives the base offset of the signal comparison for the last frame processed from base offset register 138 via a line 143. The base offset value received by combining node 169 via line 143 is the same value that is fed back to combining node 144 from base offset register 138, and it is the same value that is provided to frame offset load control unit 140 via line 139. Thus, line 143 conveys the base offset value—the number entered into base offset register 138 (and modified by an acquisition or searching variance, if desired) indicating a time at which the received transmitted signal (provided from antenna 112 to sampling node 114 via line 123) will next downwardly depart following a downward departure of the constant frequency receiver reference clock signal RxCLK provided by receiver oscillator 121. That is, the value conveyed via line 143 determines the commencement time of the next-to-be-commenced virtual frame.

Combining node 169 combines the initial code offset value received via line 168 with the base offset value received via line 143 to provide an adjusted code offset value to timing circuit 120 via a line 170. The adjusted code offset value provided via line 170 and the virtual frame commencement indicator signal provided via line 158 are employed by timing circuit 120 to determine when to produce a trigger signal on line 122. That is, the virtual frame commencement indicator signal conveyed via line 158 (sampled according to reference clock signal 4xRxCLK) indicates when a frame offset load signal is asserted. When the virtual frame commencement indicator signal on line 158 thus indicates commencement of a virtual frame, the adjusted code offset value present on line 170 (which value takes into account base offset, code offset and modulation offset) is loaded into timing circuit 120 for determination when to generate a trigger signal on line 122. A trigger signal on line 122 activates sampling by sampling node 114 of the signal received via line 123.

System 110 employs trigger signals presented via line 122 to account for base offset, account for desired seeking or tracking variance, account for "dead zones" and preserve as much of the "frame at hand" as can be preserved for use by a predetermined coding scheme to convey messages. Recall that the present invention is preferably used in time modulated communication systems. That means that there is a time period during which a pulse train representing a portion of a message may be encoded. If the loading of a frame offset parameter overlays the "frame at hand" in any amount, then the amount of such overlay reduces the available coding time in which message information may be conveyed. The present invention seeks to load frame offset information as late as possible during a base offset interval while avoiding overlapping the "frame at hand" with a "dead zone" or with other signals.

First accountings by trigger signals on line 122 for various offsets are incorporated in the base offset value provided to coding offset unit 160 via line 143. Further, trigger signals presented via line 122 account for code offsets (PN code offset and modulation code offset) and account for the effect that base offset has on the code offsets. These second accountings are incorporated in the adjusted code offset value provided to timing circuit 120 via line 170. Still further, trigger signals on line 122 are enabled in coordination with virtual frame commencement indicator signals provided to timing circuit 120 via line 158. Such multiple-offset accounting and coordination generates trigger signals on line 122 for effecting synchrony with each frame of the received transmitted signal provided by antenna 12 to sampling node 114.

Figure 14:
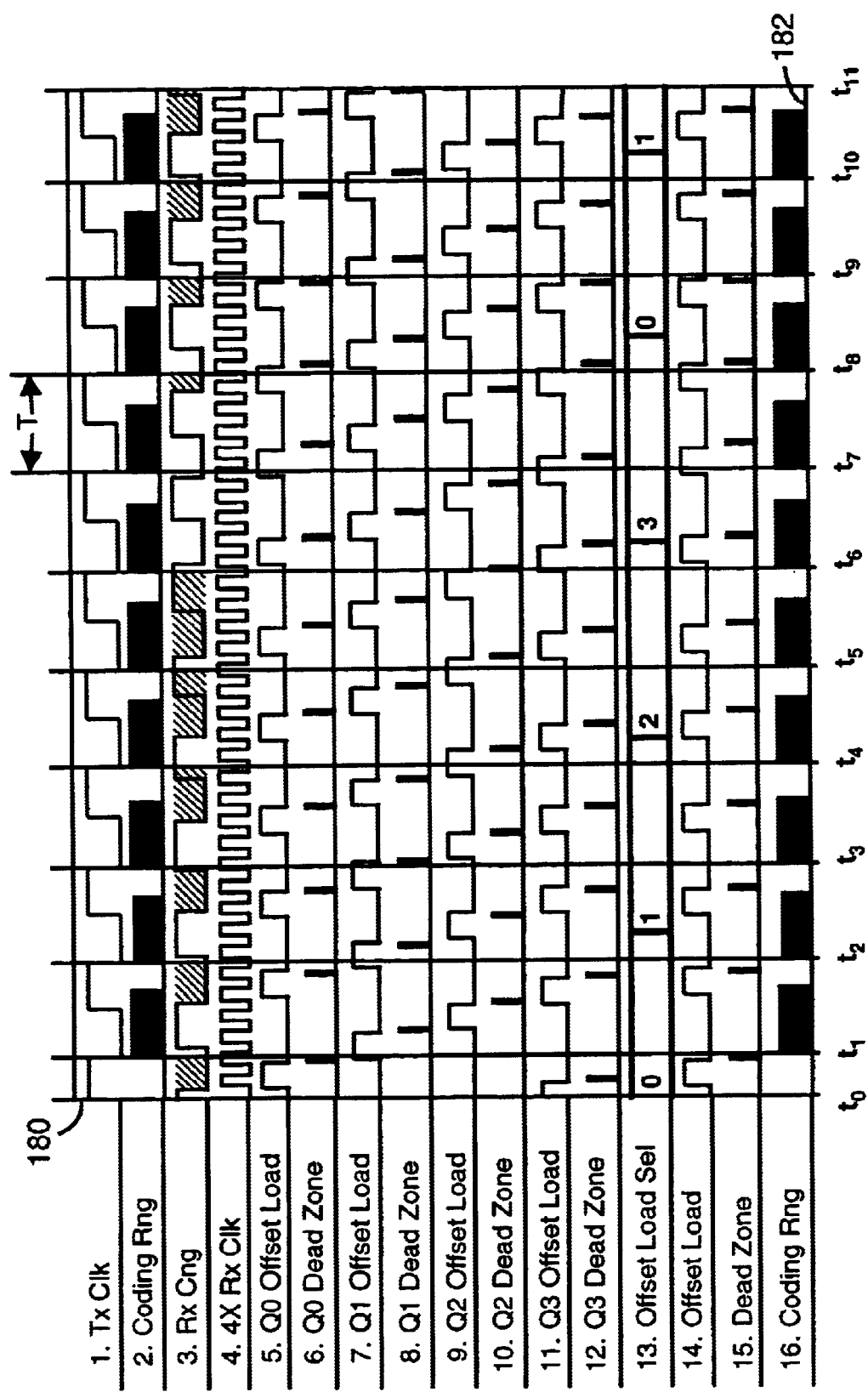
FIG. 14 is a timing diagram illustrating various signals employed by the present invention in the situation where a receiver reference signal has a higher frequency than the frequency of the received transmitted signal.

FIG. 14 is a timing diagram illustrating various signals employed by the present invention in the situation where a receiver reference signal has a higher frequency than the frequency of the received transmitted signal. In FIG. 14, a variety of related signals are plotted on an axis 180 indicating signal strength against an axis 182 indicating time. In order to facilitate understanding the present invention, signals represented in FIG. 14 will be related to the loci of their appearance within the preferred embodiment of the present invention illustrated in FIG. 13.

Signal 1 is a transmit clock signal TxCLK representing the clock signal defining frames of the received transmitted signal received by antenna 112 and provided via line 123 to sampling node 114 (FIG. 13). Transmit clock signal TxCLK is a periodic signal arranged in recurring periods T. Periods T are defined by the duration between identifiable loci within transmit clock signal TxCLK. In FIG. 14, the locus within transmit clock signal TxCLK that is taken as the basis for timing is the occurrence of a downward departure of transmit clock signal TxCLK, as occurs, for example in FIG. 14, at times $t_1$, $t_2$, $t_3$, $t_4$, $t_5$, $t_6$, $t_7$, $t_8$, $t_9$, $t_{10}$, $t_{11}$. Another locus within transmit clock signal TxCLK could be selected as a basis for timing without departing from the present invention.

Signal 2 in FIG. 14 represents a span of signal availability termed coding range, or interval CODING RNG. Interval CODING RNG is a span of time within each period T that is available for loading coded signals so that the transmitted signal clocked by transmit clock signal TxCLK may be encrypted, modulated and otherwise encoded and decoded as desired. In the preferred embodiment of the signals operating within the apparatus of the present invention (FIG. 13) illustrated in FIG. 14, interval CODING RNG spans approximately 70% of each period T.

Signal 3 in FIG. 14 represents the clock signal defining frames of the receiver clock signal RxCLK. Receiver clock signal RxCLK is generated by receiver oscillator 121 at a constant frequency ($f_{Rx}$) and provided to timing circuit 120. Of particular interest in FIG. 14 is the feature that receiver clock signal RxCLK frequency $f_{Rx}$ is a higher frequency than the frequency of transmit clock signal TxCLK. This difference is manifested in FIG. 14 by the period T of transmit clock signal TxCLK being of greater duration than the period of receiver clock signal RxCLK. In FIG. 14, the frequency $f_{Rx}$ of receiver clock signal RxCLK being higher than the frequency of transmit clock signal TxCLK results in receiver clock signal RxCLK exhibiting a "forward roll" with respect to transmit clock signal TxCLK. This forward roll relationship is highlighted in FIG. 14 by the cross-hatched portions of receiver clock signal RxCLK (signal 3 of FIG. 14). The cross-hatched intervals highlight the span of time from a downward departure of receiver clock signal RxCLK until a downward departure of transmit clock signal TxCLK. Thus, the cross-hatched portions of the plot of receiver clock signal RxCLK represent the time by which receiver clock signal RxCLK is out of synchrony with transmit clock TxCLK. That disparity of synchrony changes for each frame of receiver clock signal RxCLK; receiver clock signal RxCLK leads transmit clock signal TxCLK an increasing amount with each frame. Hence, the term "forward roll" describes the relationship between receiver clock signal RxCLK and transmit clock signal TxCLK.

The cross-hatched intervals in receiver clock signal RxCLK establish the base offset referred to in connection with FIG. 13. That is, the base offset value is a number that indicates the time occurring at the right-hand end of cross-hatched sections of signal 3 in FIG. 14, as at times $t_1$, $t_2$, $t_3$, $t_4$, $t_5$, $t_6$, $t_7$, $t_8$, $t_9$, $t_{10}$, $t_{11}$. The base offset value is stored frame-by-frame in base offset register 138.

Signal 4 in FIG. 14 is a reference clock signal that is a multiple of receiver clock signal RxCLK. In the preferred embodiment of the present invention the multiple is four, so that signal 4 is (4 times RxCLK). Reference clock signal 4×RxCLK is generated by timing circuit 120 at a frequency of ($4 \times f_{Rx}$) and is provided to frame offset load control unit 140.

Signals 5, 7, 9, 11 in FIG. 14 are frame offset load (FOL) signals that are arranged to provide periodic opportunities for loading frame offsets within the apparatus illustrated in FIG. 13. In the signal scheme illustrated in FIG. 14, FOL signals represented by signals 5, 7, 9, 11 are keyed to reference clock signal 4×RxCLK so that there are four loading offset signals. Other relationships between receiver clock signal RxCLK and FOL signals may be employed without departing from the scope of the present invention.

Signal 5 is a first frame offset load (FOL) signal Q0 OFFSET LOAD within each period of receiver clock signal RxCLK. FOL signal Q0 OFFSET LOAD occurs during the first quarter of the period of receiver clock signal RxCLK. FOL signal Q0 OFFSET LOAD is not delayed from the downward departure of receiver clock signal RxCLK, and thus is designated "Q0" to indicate that loading offset signal Q0 OFFSET LOAD is substantially in phase with receiver clock signal RxCLK.

Signal 7 is a second frame offset load (FOL) signal Q1 OFFSET LOAD within each period of receiver clock signal RxCLK. FOL signal Q1 OFFSET LOAD occurs during the second quarter of the period of receiver clock signal RxCLK. FOL signal Q1 OFFSET LOAD is delayed one quarter period from the downward departure of receiver clock signal RxCLK, and thus is designated "Q1" to indicate that one-quarter period delay with respect to receiver clock signal RxCLK.

Signal 9 is a third frame offset load (FOL) signal Q2 OFFSET LOAD within each period of receiver clock signal RxCLK. FOL signal Q2 OFFSET LOAD occurs during the third quarter of the period of receiver clock signal RxCLK. FOL signal Q2 OFFSET LOAD is delayed two quarter periods from the downward departure of receiver clock signal RxCLK, and thus is designated "Q2" to indicate that two-quarter period delay with respect to receiver clock signal RxCLK.

Signal 11 is a fourth frame offset load (FOL) signal Q3 OFFSET LOAD within each period of receiver clock signal RxCLK. FOL signal Q3 OFFSET LOAD occurs during the fourth quarter of the period of receiver clock signal RxCLK. FOL signal Q3 OFFSET LOAD is delayed three quarter periods from the downward departure of receiver clock signal RxCLK, and thus is designated "Q3" to indicate that three-quarter period delay with respect to receiver clock signal RxCLK.

Signals 6, 8, 10, 12 in FIG. 14 represent "dead zones" associated, respectively, with each of the frame offset load (FOL) signals represented in signals 5, 7, 9, 11. "Dead zones" occur because components employed to implement the apparatus of the present invention (such as, for example, comparators) require a settling time following loading of a value into the component. Dealing with a component during such a settling time is unpredictable. Thus, those settling times are deemed to be "dead zones" during which it is not desirable to deal with the apparatus of the present invention in order to assure reliability of performance, decoding, and other operational aspects of the apparatus. In practical manifestations of the preferred embodiment of the present invention the "dead zones" are estimated (with an appropriate safety margin) and accommodated using a fixed time interval rather than attempting to measure actual settling times on the fly and adjusting for settling times frame-by-frame.

Accordingly, signal 6 is a first dead zone signal Q0 DEAD ZONE establishing "dead zones" of substantially fixed duration following FOL signal Q0 OFFSET LOAD. Signal 8 is a second dead zone signal Q1 DEAD ZONE establishing "dead zones" of substantially fixed duration following occurrences of FOL signal Q1 OFFSET LOAD. Signal 10 is a third dead zone signal Q2 DEAD ZONE establishing "dead zones" of substantially fixed duration following occurrences of FOL signal Q2 OFFSET LOAD. Signal 12 is a fourth dead zone signal Q3 DEAD ZONE establishing "dead zones" of substantially fixed duration following occurrences of FOL signal Q3 OFFSET LOAD.

Line 152 provides an offset value relating to the presumed fixed duration of dead zones to combining unit 150 (FIG. 13). Combining unit 150 combines the signal at line 152 with signals received via line 148 to determine which dead zone signal Q0 DEAD ZONE, Q1 DEAD ZONE, Q2 DEAD ZONE, Q3 DEAD ZONE is to be employed for the extant frame offset load (FOL) signal assertion by frame offset load control unit 140 in effecting commencement of a virtual frame.

Signal 13 in FIG. 14 is a frame offset load (FOL) select signal OFFSET LOADSEL. FOL select signal OFFSET LOADSEL is employed by frame offset load control unit 140 (FIG. 13) to select which of the FOL signals Q0 OFFSET LOAD, Q1 OFFSET LOAD, Q2 OFFSET LOAD, Q3 OFFSET LOAD will be employed with timing circuit 120 to timely generate a trigger signal on line 122 for activating sampling node 114 in coordination with the virtual frame commencement indicator signal on line 158.

The preferred primary criterion for use by frame offset load control unit 140 in selecting among FOL signals Q0 OFFSET LOAD, Q1 OFFSET LOAD, Q2 OFFSET LOAD, Q3 OFFSET LOAD is to effect loading as close to the beginning of an interval CODING RNG for each frame of transmit clock signal TxCLK as can be accomplished without having a "dead zone" overlap an interval CODING RNG. This selection parameter seeks to maximize the interval of a respective coding range CODING RNG that is available for accommodating coding. In a time modulated communication system such a time interval availability for coding conveyance directly affects the quality, throughput, content and other crucial parameters of the communication established by the system. Other loading criteria may be imposed without departing from the present invention.

Signal 15 in FIG. 14 is a plotting of respective "dead zones" associated with respective FOL signals selected according to FOL select signal OFFSET LOADSEL. Thus, applying the desired selection criterion with the illustrative signals in FIG. 14, FOL select signal OFFSET LOADSEL selects FOL signals according to the following table:

TABLE 1

| Time Interval | Selected Offset Load Signal | Associated Dead Zone Signal |
| --- | --- | --- |
| $t_1-t_2$ | Q0 OFFSET LOAD | Q0 DEAD ZONE |
| $t_2-t_3$ | Q0 OFFSET LOAD | Q0 DEAD ZONE |
| $t_3-t_4$ | Q1 OFFSET LOAD | Q1 DEAD ZONE |
| $t_4-t_5$ | Q1 OFFSET LOAD | Q1 DEAD ZONE |
| $t_5-t_6$ | Q2 OFFSET LOAD | Q2 DEAD ZONE |
| $t_6-t_7$ | Q2 OFFSET LOAD | Q2 DEAD ZONE |
| $t_7-t_8$ | Q3 OFFSET LOAD | Q3 DEAD ZONE |
| $t_8-t_9$ | Q3 OFFSET LOAD | Q3 DEAD ZONE |
| $t_9-t_{10}$ | Q0 OFFSET LOAD | Q0 DEAD ZONE |
| $t_{10}-t_{11}$ | Q0 OFFSET LOAD | Q0 DEAD ZONE |

Signal 16 is a reproduction of signal 2 illustrating interval CODING RNG and is placed adjacent signal 15 in FIG. 14 to conveniently illustrate the selection criterion exercised by frame offset load control unit 140. That is, select the latest available frame offset load (FOL) signal available within a transmit clock signal frame without overlapping the associated dead zone signal with the coding range of the next subsequent transmit clock signal frame. In this context, the next subsequent frame is termed the "frame at hand", as that term is used in connection with explaining FIG. 13.

Figure 15:
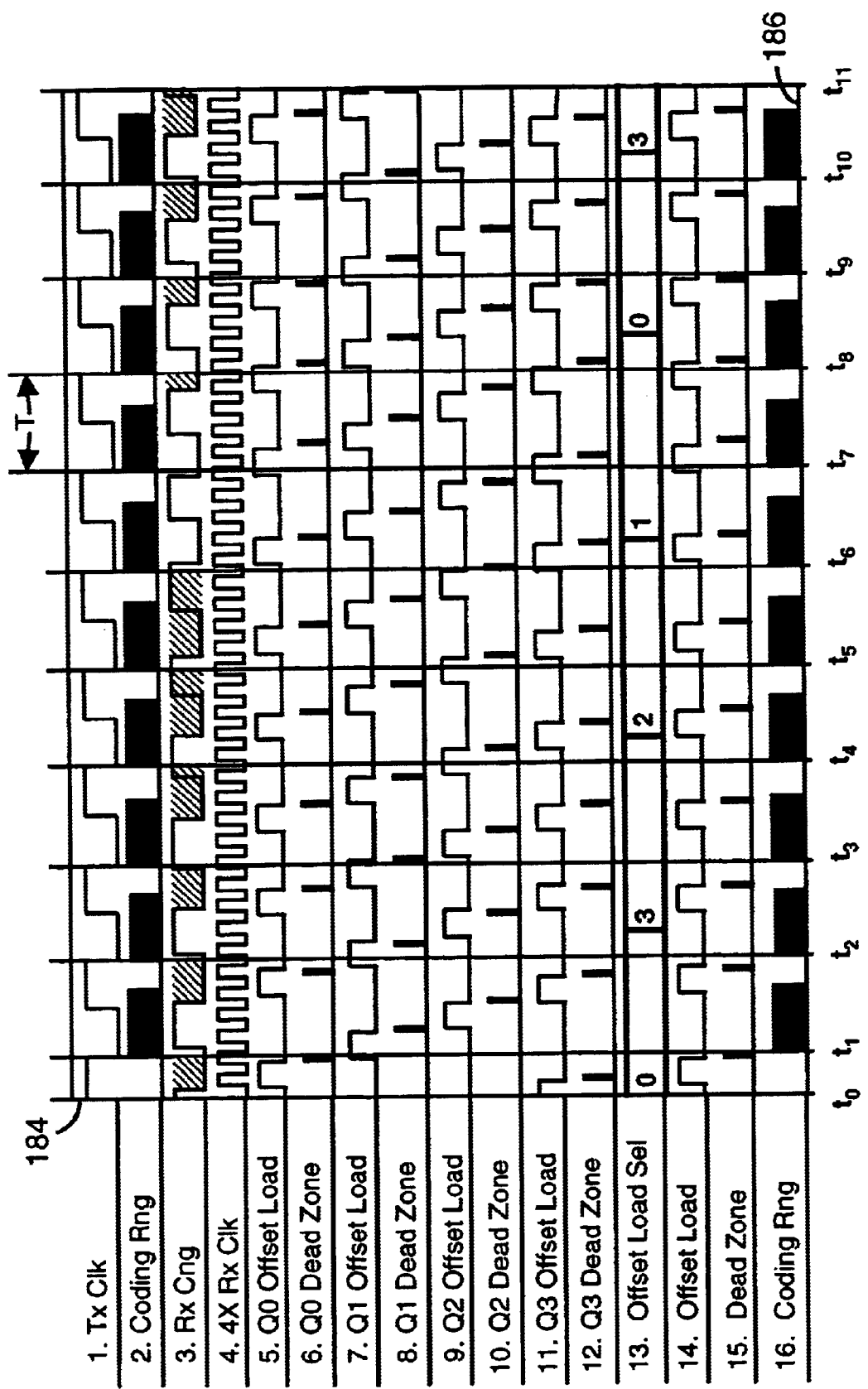
FIG. 15 is a timing diagram illustrating various signals employed by the present invention in the situation where a receiver reference signal has a lower frequency than the frequency of the received transmitted signal.

FIG. 15 is a timing diagram illustrating various signals employed by the present invention in the situation where a receiver reference signal has a lower frequency than the frequency of the received transmitted signal. In FIG. 15, a variety of related signals are plotted on an axis 184 indicating signal strength against an axis 186 indicating time. In order to facilitate understanding the present invention, signals represented in FIG. 15 will be related to the loci of their appearance within the preferred embodiment of the present invention illustrated in FIG. 13.

Signal 1 is a transmit clock signal TxCLK representing the clock signal defining frames of the received transmitted signal received by antenna 112 and provided via line 123 to sampling node 114 (FIG. 13). Transmit clock signal TxCLK is a periodic signal arranged in recurring periods T. Periods T are defined by the duration between identifiable loci within transmit clock signal TxCLK. In FIG. 15, the locus within transmit clock signal TxCLK that is taken as the basis for timing is the occurrence of a downward departure of transmit clock signal TxCLK, as occurs, for example in FIG. 15, at times $t_1$, $t_2$, $t_3$, $t_4$, $t_5$, $t_6$, $t_7$, $t_8$, $t_9$, $t_{10}$, $t_{11}$. Another locus within transmit clock signal TxCLK could be selected as a basis for timing without departing from the present invention.

Signal 2 in FIG. 15 represents a span of signal availability termed coding range, or interval CODING RNG. Interval CODING RNG is a span of time within each period T that is available for loading coded signals so that the transmitted signal clocked by transmit clock signal TxCLK may be encrypted, modulated and otherwise encoded and decoded as desired. In the preferred embodiment of the signals operating within the apparatus of the present invention (FIG. 13) illustrated in FIG. 15, interval CODING RNG spans approximately 70% of each period T.

Signal 3 in FIG. 15 represents the clock signal defining frames of the receiver clock signal RxCLK. Receiver clock signal RxCLK is generated by receiver oscillator 121 at a constant frequency ($f_{Rx}$) and provided to timing circuit 120. Of particular interest in FIG. 15 is the feature that receiver clock signal RxCLK frequency $f_{Rx}$ is a lower frequency than the frequency of transmit clock signal TxCLK. This difference is manifested in FIG. 15 by the period T of transmit clock signal TxCLK being less than the period of receiver clock signal RxCLK. In FIG. 15, the frequency $f_{Rx}$ of receiver clock signal RxCLK being lower than the frequency of transmit clock signal TxCLK results in receiver clock signal RxCLK exhibiting a "backward roll" with respect to transmit clock signal TxCLK. This backward roll relationship is highlighted in FIG. 15 by the cross-hatched portions of receiver clock signal RxCLK (signal 3 of FIG. 15).

The cross-hatched intervals highlight the span of time from a downward departure of receiver clock signal RxCLK until a downward departure of transmit clock signal TxCLK. Thus, the cross-hatched portions of the plot of receiver clock signal RxCLK represent the time by which receiver clock signal RxCLK is out of synchrony with transmit clock TxCLK. That disparity of synchrony changes for each frame of receiver clock signal RxCLK; receiver clock signal RxCLK lags transmit clock signal TxCLK an increasing amount with each frame. Hence, the term "backward roll" describes the relationship between receiver clock signal RxCLK and transmit clock signal TxCLK.

The cross-hatched intervals in receiver clock signal RxCLK establish the base offset referred to in connection with FIG. 13. That is, the base offset value is a number that indicates the time occurring at the right-hand end of cross-hatched sections of signal 3 in FIG. 15, as at times $t_1$, $t_2$, $t_3$, $t_4$, $t_5$, $t_6$, $t_7$, $t_8$, $t_9$, $t_{10}$, $t_{11}$. The base offset value is stored frame-by-frame in base offset register 138.

The remaining signals illustrated in FIG. 15 are substantially similar to the signals illustrated in FIG. 14. However, because of the "backward roll" relation between receiver clock signal RxCLK and transmit clock signal TxCLK, signal 14 in FIG. 15 reveals that different offset load signals are selected to effect synchrony in a "backward roll" situation than are selected to deal with a "forward roll" situation.

Thus, signal 4 in FIG. 15 is a reference clock signal 4×RxCLK that has a frequency that is a multiple of 4 times the frequency of receiver clock signal RxCLK. Reference clock signal 4×RxCLK is generated by timing circuit 120 at a frequency of ($4 \times f_{Rx}$) and is provided to frame offset load control unit 140.

Signals 5, 7, 9, 11 in FIG. 15 are frame offset load (FOL) signals that are arranged to provide periodic opportunities for loading offsets within the apparatus illustrated in FIG. 13. In the signal scheme illustrated in FIG. 15, loading offset signals represented by signals 5, 7, 9, 11 are keyed to reference clock signal 4×RxCLK so that there are four loading offset signals. Other relationships between receiver clock signal RxCLK and loading offset signals may be employed without departing from the scope of the present invention.

Signal 5 is a first frame offset load (FOL) signal Q0 OFFSET LOAD within each period of receiver clock signal RxCLK. FOL signal Q0 OFFSET LOAD occurs during the first quarter of the period of receiver clock signal RxCLK. FOL signal Q0 OFFSET LOAD is not delayed from the downward departure of receiver clock signal RxCLK, and thus is designated "Q0" to indicate that FOL signal Q0 OFFSET LOAD is substantially in phase with receiver clock signal RxCLK.

Signal 7 is a second frame offset load (FOL) signal Q1 OFFSET LOAD within each period of receiver clock signal RxCLK. FOL signal Q1 OFFSET LOAD occurs during the second quarter of the period of receiver clock signal RxCLK. FOL signal Q1 OFFSET LOAD is delayed one quarter period from the downward departure of receiver clock signal RxCLK, and thus is designated "Q1" to indicate that one-quarter period delay with respect to receiver clock signal RxCLK.

Signal 9 is a third frame offset load (FOL) signal Q2 OFFSET LOAD within each period of receiver clock signal RxCLK. FOL signal Q2 OFFSET LOAD occurs during the third quarter of the period of receiver clock signal RxCLK. FOL signal Q2 OFFSET LOAD is delayed two quarter periods from the downward departure of receiver clock signal RxCLK, and thus is designated "Q2" to indicate that two-quarter period delay with respect to receiver clock signal RxCLK.

Signal 11 is a fourth frame offset load (FOL) signal Q3 OFFSET LOAD within each period of receiver clock signal RxCLK. FOL signal Q3 OFFSET LOAD occurs during the fourth quarter of the period of receiver clock signal RxCLK. FOL signal Q3 OFFSET LOAD is delayed three quarter period from the downward departure of receiver clock signal RxCLK, and thus is designated "Q3" to indicate that three-quarter period delay with respect to receiver clock signal RxCLK.

Signals 6, 8, 10, 12 in FIG. 15 represent "dead zones" associated, respectively, with each of the frame offset load (FOL) signals represented in signals 5, 7, 9, 11. "Dead zones" occur because components employed to implement the apparatus of the present invention (such as, for example, comparators) require a settling time following loading of a value into the component. Dealing with a component during such a settling time is unpredictable. Thus, those settling times are deemed to be "dead zones" during which it is not desirable to deal with the apparatus of the present invention in order to assure reliability of performance, decoding, and other operational aspects of the apparatus. In practical manifestations of the preferred embodiment of the present invention the "dead zones" are estimated (with an appropriate safety margin) and accommodated using a fixed time interval rather than attempting to measure actual settling times on the fly and adjusting for settling times frame-by-frame.

Accordingly, signal 6 is a first dead zone signal Q0 DEAD ZONE establishing "dead zones" of substantially fixed duration following occurrences of FOL signal Q0 OFFSET LOAD. Signal 8 is a second dead zone signal Q1 DEAD ZONE establishing "dead zones" of substantially fixed duration following occurrences of FOL signal Q1 OFFSET LOAD. Signal 10 is a third dead zone signal Q2 DEAD ZONE establishing "dead zones" of substantially fixed duration following occurrences of FOL signal Q2 OFFSET LOAD. Signal 12 is a fourth dead zone signal Q3 DEAD ZONE establishing "dead zones" of substantially fixed duration following occurrences of FOL signal Q3 OFFSET LOAD.

Line 152 provides an offset value relating to the presumed fixed duration of dead zones to combining unit 150 (FIG. 13). Combining unit 150 combines the signal at line 152 with signals received via line 148 to determine which dead zone signal Q0 DEAD ZONE, Q1 DEAD ZONE, Q2 DEAD ZONE, Q3 DEAD ZONE is to be employed for the extant frame offset load (FOL) signal assertion by frame offset load control unit 140 in effecting commencement of a virtual frame.

Signal 13 in FIG. 15 is a frame offset load (FOL) select signal OFFSET LOADSEL. FOL select signal OFFSET LOADSEL is employed by frame offset load control unit 140 to select which of the FOL signals Q0 OFFSET LOAD, Q1 OFFSET LOAD, Q2 OFFSET LOAD, Q3 OFFSET LOAD will be employed with timing circuit 120 to timely generate a trigger signal on line 122 for activating sampling node 114 in coordination with the virtual frame commencement indicator signal on line 158.

The preferred primary criterion for use by frame offset load control unit 140 in selecting among FOL signals Q0 OFFSET LOAD, Q1 OFFSET LOAD, Q2 OFFSET LOAD, Q3 OFFSET LOAD is to effect loading of code offsets as close to the beginning of an interval CODING RNG for each frame of transmit clock signal TxCLK as can be accomplished without having a "dead zone" overlap an interval CODING RNG. This selection parameter seeks to maximize the interval of a respective coding range CODING RNG that is available for accommodating coding. In a time modulated communication system such a time interval availability for coding conveyance directly affects the quality, throughput, content and other crucial parameters of the communication established by the system.

Signal 15 in FIG. 15 is a plotting of respective "dead zones" associated with respective FOL signals selected according to FOL select signal OFFSET LOADSEL. Thus, applying the desired selection criterion with the illustrative signals in FIG. 15, FOL select signal OFFSET LOADSEL selects FOL signals according to the following table:

TABLE 2

| Time Interval | Selected Offset Load Signal | Associated Dead Zone Signal |
| --- | --- | --- |
| $t_1$–$t_2$ | Q0 OFFSET LOAD | Q0 DEAD ZONE |
| $t_2$–$t_3$ | Q3 OFFSET LOAD | Q3 DEAD ZONE |
| $t_3$–$t_4$ | Q3 OFFSET LOAD | Q3 DEAD ZONE |
| $t_4$–$t_5$ | Q2 OFFSET LOAD | Q2 DEAD ZONE |
| $t_5$–$t_6$ | Q2 OFFSET LOAD | Q2 DEAD ZONE |
| $t_6$–$t_7$ | Q1 OFFSET LOAD | Q1 DEAD ZONE |
| $t_7$–$t_8$ | Q1 OFFSET LOAD | Q1 DEAD ZONE |
| $t_8$–$t_9$ | Q0 OFFSET LOAD | Q0 DEAD ZONE |
| $t_9$–$t_{10}$ | Q0 OFFSET LOAD | Q0 DEAD ZONE |
| $t_{10}$–$t_{11}$ | Q3 OFFSET LOAD | Q3 DEAD ZONE |

Signal 16 is a reproduction of signal 2 illustrating interval CODING RNG and is placed adjacent signal 15 in FIG. 15 to conveniently illustrate the selection criterion exercised by frame offset load control unit 140. That is, select the latest available FOL signal available within a transmit clock signal frame without overlapping the associated dead zone signal with the coding range of the next subsequent frame. In this context, the next subsequent frame is termed the "frame at hand", as that term is used in connection with explaining FIG. 13.

Figure 16:
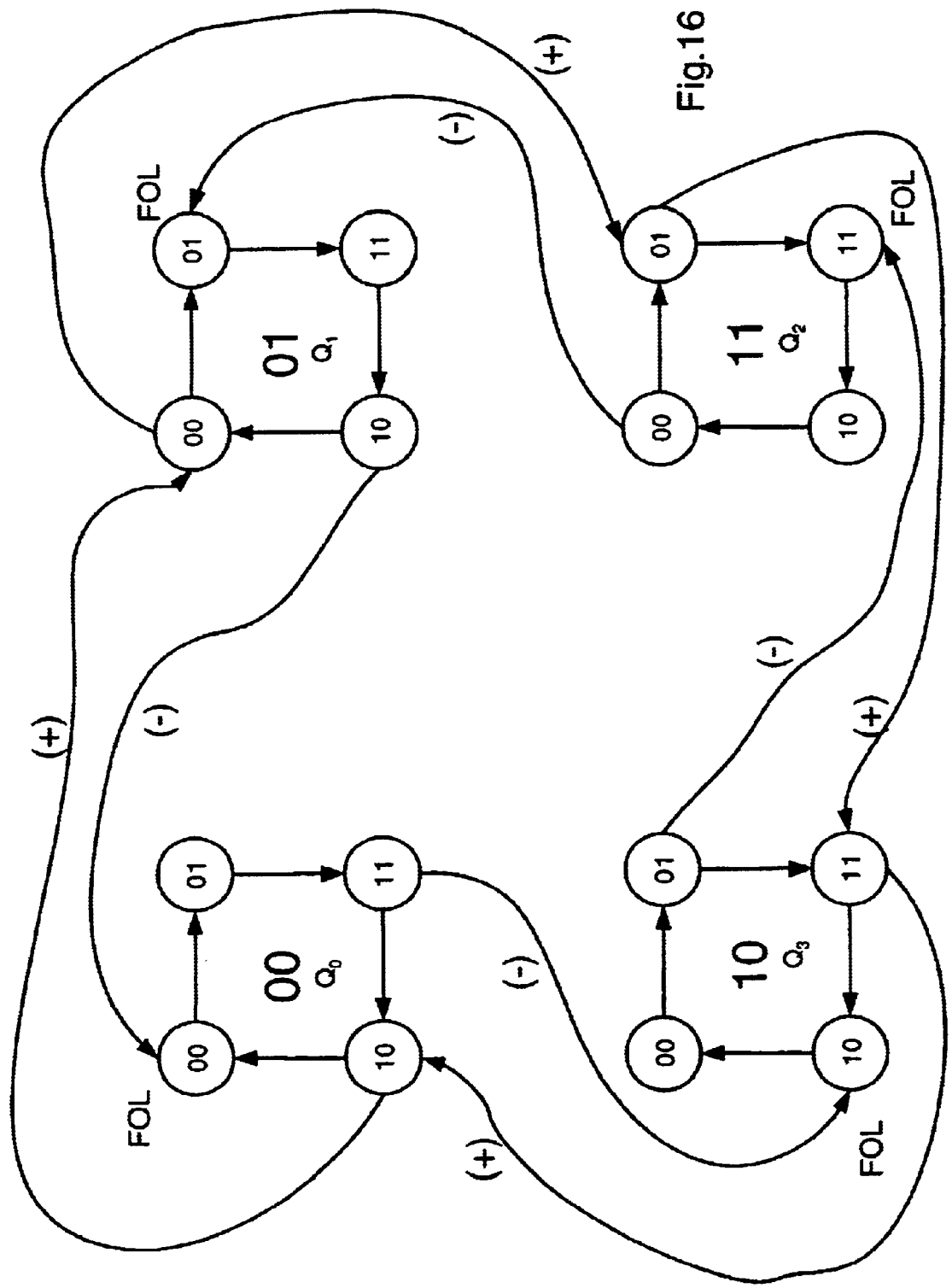
FIG. 16 is a state diagram illustrating the operation of a state machine employed in the present invention.

FIG. 16 is a state diagram illustrating the operation of a state machine employed in the present invention. In FIG. 16, a state machine 100 has sixteen states arranged with each of four state groups 00xx, 01xx, 11xx, 10xx having four state levels.

Thus, state group 00xx includes state levels 0000, 0001, 0011, 0010; state group 01xx includes state levels 0100, 0101, 0111, 0110; state group 11xx includes state levels 1100, 1101, 1111, 1110; and state group 10xx includes state levels 1000, 1001, 1011, 1010.

In the preferred embodiment of the present invention each state group 00xx, 01xx, 11xx, 10xx relates to a quadrant of receiver clock signal RxCLK. That is, each state group 00xx, 01xx, 11xx, 10xx identifies, for a particular cycle of reference clock signal 4×RxCLK (FIGS. 14, 15), in which state level an FOL signal will be asserted. Thus, state group 00xx establishes that in first quadrant $Q_0$ of receiver clock signal RxCLK (i.e., the first cycle of reference clock signal 4×RxCLK in a given frame of receiver clock signal RxCLK) an FOL signal may be asserted in state level 0000. State group 01xx establishes that in second quadrant $Q_1$ of receiver clock signal RxCLK (i.e., the second cycle of reference clock signal 4×RxCLK in a given frame of receiver clock signal RxCLK) an FOL signal may be asserted in state level 0101. State group 11xx establishes that in third quadrant $Q_2$ of receiver clock signal RxCLK (i.e., the third cycle of reference clock signal 4×RxCLK in a given frame of receiver clock signal RxCLK) an FOL signal may be asserted in state level 1111. State group 10xx establishes that in fourth quadrant $Q_3$ of receiver clock signal RxCLK (i.e., the fourth cycle of reference clock signal 4×RxCLK in a given frame of receiver clock signal RxCLK) an FOL signal may be asserted in state level 1010. In the preferred embodiment of state machine 100 illustrated in FIG. 16, quadrants are gray coded, but other coding schemes may be employed while retaining the advantages provided by state machine 100.

Each state level represents one-quarter of a frame of receiver clock signal RxCLK. The frame of receiver clock signal RxCLK is a "real" frame as seen by timing circuit 120 in receiver clock signal RxCLK received from receiver oscillator 121 (FIG. 13). At each cycle of reference clock signal 4×RxCLK state machine 100 makes a transition between state levels. Which of the four state groups 00xx, 01xx, 11xx, 10xx is involved for a particular state transition between state levels is dependent upon which quadrant (i.e., which cycle of reference clock signal 4×RxCLK) involves indication of assertion of a frame offset load (FOL) by frame offset load control unit 140 in a virtual frame commencement indicator signal conveyed via line 158 to timing circuit 120 (FIG. 13).

When a communication system employing the present invention is in a stable state wherein receiver clock signal RxCLK and transmit clock signal TxCLK are not "rolling" with respect to each other, state machine 100 effects state transitions solely within one state group 00xx, 01xx, 11xx, 10xx, and no inter-group transitions are made. Inter-group transitions are carried out when receiver clock signal RxCLK exhibits either a "forward roll" (FIG. 14) or a "backward roll" (FIG. 15) with respect to transmit clock TxCLK. In either the "forward roll" situation or the "backward roll" situation, state transitions within a state group occur in clockwise fashion in FIG. 16, as indicated by arrows between state levels within each state group 00xx, 01xx, 11xx, 10xx.

State transitions between state groups 00xx, 01xx, 11xx, 10xx (i.e., inter-group state transitions) occur only at state levels identified as an origin of an arrow in FIG. 16. Inter-group arrows denoted with a plus sign identify inter-group state transitions in a "forward roll" situation; inter-group arrows denoted with a minus sign identify inter-group state transitions in a "backward roll" situation. Thus, when receiver clock signal RxCLK exhibits a "forward roll" with respect to transmit clock signal TxCLK, a state transition from state group 00xx may only occur from state 0010, a state transition from state group 01xx may only occur from state 0100, a state transition from state group 11xx may only occur from state 1101, and a state transition from state group 10xx may only occur from state 1011. When receiver clock signal RxCLK exhibits a "backward roll" with respect to transmit clock signal TxCLK, a state transition from state group 00xx may only occur from state 0011, a state transition from state group 10xx may only occur from state 1001, a state transition from state group 11xx may only occur from state 1100, and a state transition from state group 01xx may only occur from state 0110.

For purposes of employing state machine 100 (and for purposes of explaining operation of state machine 100) certain conventions are imposed. For example, in state group 00xx frame offset load (FOL) may only be asserted in state level 0000, in state group 01xx FOL may only be asserted in the state level 0101, in state group 11xx FOL may only be asserted in the state level 1111, and in state group 10xx FOL may only be asserted in the state level 1010. This convention is illustrated in FIG. 15 by denoting state levels 0000, 0101, 1111, 1010 as "FOL" states.

Assertion of a frame offset load (FOL) effects a state transition. Base offset value determines the start of a virtual frame. Depending upon how asynchronous signals TxCLK, RxCLK are, and depending upon whether the relationship of receiver clock signal RxCLK with respect to transmit clock signal TxCLK manifests "forward roll" or "backward roll", virtual frames may have possible lengths, or periods ranging from three to five clocks of reference clock signal 4×RxCLK. If signals RxCLK, TxCLK manifest no "roll", state machine 100 will "cycle" within one state group 00xx, 01xx, 11xx, 10xx and virtual frames will be created having periods of four clocks of reference clock signal 4×RxCLK. If signals RxCLK, TxCLK manifest a "backward roll" relationship, state machine 100 will "cycle" among state groups 00xx, 01xx, 11xx, 10xx and virtual frames will be created having periods of three clocks of reference clock signal 4×RxCLK. If signals RxCLK, TxCLK manifest a "forward roll" relationship, state machine 100 will "cycle" among state groups 00xx, 01xx, 11xx, 10xx and virtual frames will be created having periods of five clocks of reference clock signal 4×RxCLK. This operation will be described in detail in connection with FIG. 17.

Virtual frames are created to effect synchrony with received transmit signals to facilitate acquisition and decoding of received transmit signals by a receiver. A consideration in selecting the conventions imposed for purposes of this explanation is to seek to await the last possible clock signal (i.e., an "uptick" of reference clock signal 4×RxCLK) to effect transition from one state to another. The important effect of such an arrangement (other arrangements could be employed) is that state machine 100 controls FOL assertion appropriately to avoid omitting or duplicating a state transition for any given virtual frame. One convention adopted for employing state machine 100 with the present invention is that state machine 100 waits until the latest possible clock signal (e.g., "uptick" of reference clock signal 4×RxCLK) to transition between states. This convention is arbitrarily chosen and may be changed without departing from the present invention. Another convention, in keeping with the above convention, is to adopt the following relationships for selecting an FOL state in which FOL will be asserted:

TABLE 3

| BASE OFFSET RANGE | FOL STATE |
| --- | --- |
| $1^{st}$ Quadrant Dead Zone | 1111 |
| $1^{st}$ Quadrant Except Dead Zone | 1010 |
| $2^{nd}$ Quadrant Dead Zone | 1010 |
| $2^{nd}$ Quadrant Except Dead Zone | 0000 |
| $3^{rd}$ Quadrant Dead Zone | 0000 |
| $3^{rd}$ Quadrant Except Dead Zone | 0101 |
| $4^{th}$ Quadrant Dead Zone | 0101 |
| $4^{th}$ Quadrant Except Dead Zone | 1111 |

The "forward roll" relation between signals TxCLK and RxCLK will be employed for explaining employment of state machine 100 with the present invention. In order to avoid prolixity, and in recognition that one skilled in the art may transfer the lessons learned in the "forward roll" illustration to the "backward roll" relation (FIG. 15), only the "forward roll" relation will be explained in detail.

Figure 17:
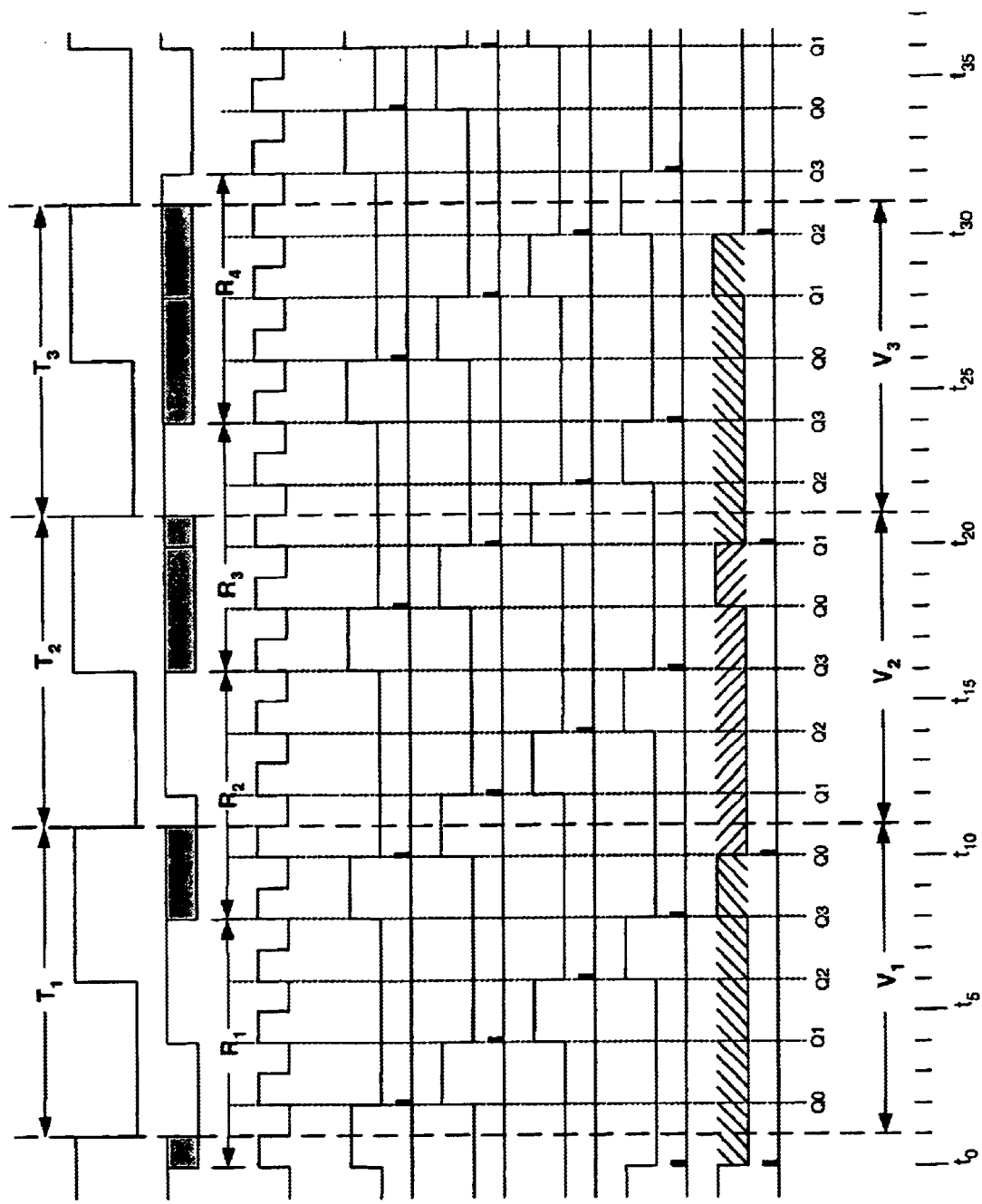
FIG. 17 is a timing diagram illustrating various signals to explain employment of the state machine illustrated in FIG. 16 as the state machine is employed with the preferred embodiment of the present invention.

FIG. 17 is a timing diagram illustrating various signals to explain employment of the state machine illustrated in FIG. 16 as the state machine is employed with the preferred embodiment of the present invention. In FIG. 17, the receiver reference signal has a higher frequency than the frequency of the received transmitted signal. FIG. 17 is similar to FIG. 14, presented on a larger scale and labeled appropriately to relate with state machine 100 illustrated in FIG. 16.

Signal 1 in FIG. 17 is a transmit clock signal TxCLK representing the clock signal defining frames of the received transmitted signal. Transmit clock signal TxCLK is a periodic signal arranged in recurring periods $T_1$, $T_2$, $T_3$. Periods $T_1$, $T_2$, $T_3$ are defined by the duration between identifiable loci within transmit clock signal TxCLK, such as the occurrence of a downward departure of transmit clock signal TxCLK, as occurs, for example in FIG. 17, at times $t_1$, $t_{11}$, $t_{21}$, $t_{31}$. Another locus within transmit clock signal TxCLK could be selected as a basis for timing without departing from the present invention.

Signal 2 in FIG. 17 represents the clock signal defining frames of the receiver clock signal RxCLK. Receiver clock signal RxCLK is a periodic signal arranged in recurring periods $R_1$, $R_2$, $R_3$, $R_4$. Receiver clock signal RxCLK frequency $f_{Rx}$ is a higher frequency than the frequency of transmit clock signal TxCLK. This difference is manifested in FIG. 17 by the period T of transmit clock signal TxCLK being greater than the period R of receiver clock signal RxCLK. In FIG. 17, the frequency $f_{Rx}$ of receiver clock signal RxCLK being higher than the frequency of transmit clock signal TxCLK results in receiver clock signal RxCLK exhibiting a "forward roll" with respect to transmit clock signal TxCLK. This forward roll relationship is highlighted in FIG. 17 by the shaded portions of receiver clock signal RxCLK. The shaded intervals highlight the span of time from a downward departure of receiver clock signal RxCLK until a downward departure of transmit clock signal TxCLK. Thus, the shaded portions of the plot of receiver clock signal RxCLK represent the time by which receiver clock signal RxCLK is out of synchrony with transmit clock TxCLK. That disparity of synchrony changes for each frame of receiver clock signal RxCLK; receiver clock signal RxCLK leads transmit clock signal TxCLK an increasing amount with each frame. Hence, the term "forward roll" describes the relationship between receiver clock signal RxCLK and transmit clock signal TxCLK.

The shaded intervals in receiver clock signal RxCLK establish the base offset referred to in connection with FIG. 13. That is, the base offset value is a number that indicates the time occurring at the right-hand end of cross-hatched sections of signal 2 in FIG. 17, as at times $t_1$, $t_{11}$, $t_{21}$, $t_{31}$. The base offset value is stored frame-by-frame in base offset register 138 (FIG. 13).

Signal 3 in FIG. 17 is a reference clock signal 4xRxCLK that has a frequency that is a multiple of four times the frequency of receiver clock signal RxCLK. Thus, reference clock signal 4xRxCLK occurs in cycles coincident with quadrants of receiver clock signal RxCLK. Reference clock signal 4xRxCLK is generated by timing circuit 120 and is provided to frame offset load control unit 140 (FIG. 13).

Receiver clock signal RxCLK is provided to frame offset load control unit 140 via line 155 (FIG. 13). Thus, the state machine (FIG. 16) is able to keep track of receiver clock signal RxCLK and can, therefore, keep track of which quadrant of receiver clock signal RxCLK is extant. For this reason, the state machine can account for which cycle of reference clock signal 4xRxCLK is extant, and can thereby identify which frame offset load (FOL) signal is to be asserted.

Signals 4, 6, 8, 10 in FIG. 17 represent frame offset load (FOL) signals that are arranged to provide periodic opportunities for loading offsets. FOL signals represented by signals 4, 6, 8, 10 are keyed to reference clock signal 4xRxCLK so that there are four loading offset signals. Other relationships between receiver clock signal RxCLK and loading offset signals may be employed without departing from the scope of the present invention.

Signal 4 in FIG. 17 represents a first-quadrant FOL signal Q0FOL. First quadrant FOL signal Q0FOL conforms with the first cycle of reference clock signal 4xRxCLK within each receiver period $R_1$, $R_2$, $R_3$, $R_4$ and is preferably loaded (when appropriate) when the rising edge of reference clock signal 4xRxCLK deasserts first quadrant FOL signal Q0FOL, as at times $t_2$, $t_{10}$, $t_{18}$, $t_{26}$, $t_{34}$ in FIG. 17. Signal 6 in FIG. 17 represents a second quadrant FOL signal Q1FOL. Second quadrant FOL signal Q1FOL conforms with the second cycle of reference clock signal 4xRxCLK within each receiver period $R_1$, $R_2$, $R_3$, $R_4$ and is preferably loaded (when appropriate) when the rising edge of reference clock signal 4xRxCLK deasserts second quadrant FOL signal Q1FOL, as at times $t_4$, $t_{12}$, $t_{20}$, $t_{28}$, $t_{36}$ in FIG. 17. Signal 8 in FIG. 17 represents a third quadrant FOL signal Q2FOL. Third quadrant FOL signal Q2FOL conforms with the third cycle of reference clock signal 4xRxCLK within each receiver period $R_1$, $R_2$, $R_3$, $R_4$ and is preferably loaded (when appropriate) when the rising edge of reference clock signal 4xRxCLK deasserts third quadrant FOL signal Q2FOL, as at times $t_6$, $t_{14}$, $t_{22}$, $t_{30}$ in FIG. 17. Signal 10 in FIG. 17 represents a fourth quadrant FOL signal Q3FOL. Fourth quadrant FOL signal Q3FOL conforms with the fourth cycle of reference clock signal 4xRxCLK within each receiver period $R_1$, $R_2$, $R_3$, $R_4$ and is preferably loaded (when appropriate) when the rising edge of reference clock signal 4xRxCLK deasserts fourth quadrant FOL signal Q3FOL, as at times $t_8$, $t_{16}$, $t_{24}$, $t_{32}$ in FIG. 17.

It may be established for purposes of definition that a quadrant of receiver clock signal RxCLK spans a time from a first "uptick" of reference clock signal 4xRxCLK until the deassertion of the FOL signal associated with that quadrant at the next subsequent "uptick" of reference clock signal 4xRxCLK following the first "uptick". Such a definition will be used as a basis for describing the operation of state machine 100 (FIG. 16) as it is employed in connection with the present invention experiencing signals such as the signals illustrated in FIG. 17.

Thus, first quadrants are found in FIG. 17 between time $t_0$ until the "uptick" of signal 4xRxCLK at time $t_2$, between time $t_8$ until the "uptick" of signal 4xRxCLK at time $t_{10}$, between time $t_{16}$ until the "uptick" of signal 4xRxCLK at time $t_{18}$, between time $t_{24}$ until the "uptick" of signal 4xRxCLK at time $t_{26}$, and between time $t_{32}$ until the "uptick" of signal 4xRxCLK at time $t_{34}$.

Second quadrants are found in FIG. 17 between time $t_2$ until the "uptick" of signal 4xRxCLK at time $t_4$, between time $t_{10}$ until the "uptick" of signal 4xRxCLK at time $t_{12}$, between time $t_{18}$ until the "uptick" of signal 4xRxCLK at time $t_{20}$, between time $t_{26}$ until the "uptick" of signal 4xRxCLK at time $t_{28}$, and between time $t_{34}$ until the "uptick" of signal 4xRxCLK at time $t_{36}$.

Third quadrants are found in FIG. 17 between time $t_4$ until the "uptick" of signal 4xRxCLK at time $t_6$, between time $t_{12}$ until the "uptick" of signal 4xRxCLK at time $t_{14}$, between time $t_{20}$ until the "uptick" of signal 4xRxCLK at time $t_{22}$, and between time $t_{28}$ until the "uptick" of signal 4xRxCLK at time $t_{30}$.

Fourth quadrants are found in FIG. 17 between time $t_6$ until the "uptick" of signal 4xRxCLK at time $t_8$, between time $t_{14}$ until the "uptick" of signal 4xRxCLK at time $t_{16}$, between time $t_{22}$ until the "uptick" of signal 4xRxCLK at time $t_{24}$, and between time $t_{30}$ until the "uptick" of signal 4xRxCLK at time $t_{32}$.

Signals 5, 7, 9, 11 in FIG. 17 represent "dead zones" associated, respectively, with each of the representative frame offset load (FOL) signals represented in signals 4, 6, 8, 10. "Dead zones" occur because components employed to implement the apparatus of the present invention (such as, for example, comparators) require a settling time following loading of a value into the component. Further dealing with a component during such a settling time is unpredictable. Thus, those settling times are deemed to be "dead zones" during which it is not desirable to deal with the apparatus of the present invention in order to assure reliability of performance, decoding, and other operational aspects of the apparatus. In practical manifestations of the preferred embodiment of the present invention the "dead zones" are estimated (with an appropriate safety margin) and accommodated using a fixed time interval rather than attempting to measure actual settling times on the fly and adjusting for settling times frame-by-frame.

Accordingly, signal 5 represents a first dead zone signal Q0DZ establishing "dead zones" of substantially fixed duration following deassertions of first quadrant FOL signals Q0FOL, as at times $t_2$, $t_{10}$, $t_{18}$, $t_{26}$, $t_{34}$ in FIG. 17. Signal 7 represents a second dead zone signal Q1DZ establishing "dead zones" of substantially fixed duration following deassertions of second quadrant FOL signals Q1FOL, as at times $t_4$, $t_{12}$, $t_{20}$, $t_{28}$, $t_{36}$ in FIG. 17. Signal 9 represents a third dead zone signal Q2DZ establishing "dead zones" of substantially fixed duration following deassertions of third quadrant FOL signals Q2FOL, as at times $t_6$, $t_{14}$, $t_{22}$, $t_{30}$ in FIG. 17. Signal 11 represents a fourth dead zone signal Q3DZ establishing "dead zones" of substantially fixed duration following deassertions of fourth quadrant FOL signals Q3FOL, as at times $t_8$, $t_{16}$, $t_{24}$, $t_{32}$ in FIG. 17.

Line 152 provides an offset value relating to the presumed fixed duration of dead zones to combining unit 150 (FIG. 13). Combining unit 150 combines the signal at line 152 with signals received via line 148 to determine which dead zone signal Q0DZ, Q1DZ, Q2DZ, Q3DZ is to be employed for the extant frame offset load (FOL) signal assertion by frame offset load control unit 140 in effecting commencement of a virtual frame.

Signal 12 in FIG. 17 is the selected FOL signal employed by frame offset load control unit 140 during a given frame of transmit clock signal TxCLK to load offsets into coding offset unit 160 and to employ by timing circuit 120 in determining when to produce a timing signal via line 122 to sampling node 114.

Signal 13 in FIG. 17 is a plotting of respective "dead zones" associated with respective FOL signals selected according to FOL select signal QSEL.

In explaining employment of state machine 100 (FIG. 16) with the present invention we shall focus upon period $T_2$ of transmit clock signal TxCLK (signal 1 in FIG. 17). Design realities such as signal propagation delays and similar phenomena are not factored into the explanation in order to more clearly relate the operational relations involved.

Comparing signal 1 (TxCLK) with signal 2 (RxCLK) in FIG. 17, one may observe that the shaded portion representing the expanse of the base offset terminates at its right-hand end at time $t_{11}$. A base offset value representing time $t_{11}$ is therefore provided to base offset register 138 (FIG. 13). The base offset value may be a predicted base offset value, if desired, or may be a hybrid of an observed base offset value and a predicted base offset value. In order to simplify the explanation, it is assumed for this example that there is no acquisition or tracking offset value involved.

The base offset value establishes the beginning of a virtual frame to be created by system 110 (FIG. 13) in order to establish synchrony between system 110 and transmit clock signal TxCLK. In FIG. 17, virtual frames $V_1$, $V_2$, $V_3$ are established as beginning with successive base offset values. Thus, virtual frame $V_1$ begins at time $t_1$, virtual frame $V_2$ begins at time $t_{11}$, and virtual frame $V_3$ begins at time $t_{21}$. The commencement times for virtual frames $V_1$, $V_2$, $V_3$ coincide with commencement times of periods $T_1$, $T_2$, $T_3$ of transmit receive clock TxCLK.

A value indicating time $t_{11}$ falls within the "second quadrant except dead zone" time expanse, i.e., within the time period $t_{10}$–$t_{12}$. Therefore, using the conventions summarized in Table 3 above, a FOL state of 0000 is selected for the FOL signal that is to initiate period $T_2$. Consequently, state machine 100 (FIG. 16) is in state 0000 during the time period $t_8$–$t_{10}$. At the next "uptick" of reference clock signal 4×RxCLK (at time $t_{10}$) state machine 100 asserts FOL because state 0000 is a FOL asserting state (designated "FOL" in FIG. 16), and state machine 100 transitions states from state 0000 to state 0001.

At time $t_{10}$ reference clock signal 4×RxCLK notes the deassertion of first quadrant signal Q0FOL and indicates that occurrence to timing circuit 120 via line 158 as a virtual frame commencement indicator signal. Timing circuit 120 is thereby enabled to employ the adjusted code offset value received via line 170 to produce a trigger signal on line 122 to sampling node 114 (FIG. 13).

As a result, state machine 100 is in state 0001 during the time period $t_{10}$–$t_{12}$. The next "uptick" of reference clock signal 4×RxCLK occurs at time $t_{12}$, and state machine 100 transitions states from state 0001 to state 0011. State machine 100 does not assert FOL because state 0011 is not a FOL asserting state (not designated "FOL" in FIG. 16).

The next "uptick" of reference clock signal 4×RxCLK occurs at time $t_{14}$, and state machine 100 transitions states from state 0011 to state 0010. State machine 100 does not assert FOL because state 0011 is not a FOL asserting state (not designated "FOL" in FIG. 16). The next "uptick" of reference clock signal 4×RxCLK occurs at time $t_{16}$, and state machine 100 transitions states from state 0001 to state 0100. The transition to another state group occurs because the value loaded into frame offset control unit 140 via line 154 (FIG. 13) indicates that the base offset has changed and a state group change is necessary. The base offset value indicates that the relation between signals RxCLK and TxCLK manifests a "roll" and is not stable. State machine 100 does not assert FOL because state 0100 is not a FOL asserting state (not designated "FOL" in FIG. 16).

The next "uptick" of reference clock signal 4×RxCLK occurs at time $t_{18}$, and state machine 100 transitions states from state 0100 to state 0101. State machine 100 asserts FOL because state 0101 is a FOL asserting state (designated "FOL" in FIG. 16). Thus, FOL signal Q1FOL is asserted at time $t_{18}$. The next "uptick" of reference clock signal 4×RxCLK occurs at time $t_{20}$, and state machine 100 transitions states from state 0101 to state 0111. State machine 100 does not assert FOL because state 0111 is not a FOL asserting state (not designated "FOL" in FIG. 16). What does occur, however, is reference clock signal 4×RxCLK notes the deassertion of second quadrant signal Q1FOL and indicates that occurrence to timing circuit 120 via line 158 as a virtual frame commencement indicator signal, and timing circuit 120 is enabled to employ the adjusted code offset value received via line 170 to produce a trigger signal on line 122 to sampling node 114 (FIG. 13).

The exemplary signals illustrated in FIG. 17 are extreme cases in order to concisely explain operation of state machine 100 with the present invention. In ordinary operations, state machine 100 will transition states within a particular state group 00xx, 01xx, 11xx, 10xx for relatively long periods of time once signal acquisition has been accomplished and system 110 is in a tracking mode to maintain synchrony. A situation in which a different quadrant FOL signal is employed for virtual frame creation every period of transmit clock signal TxCLK is not an ordinary operational occurrence.

Figure 18:
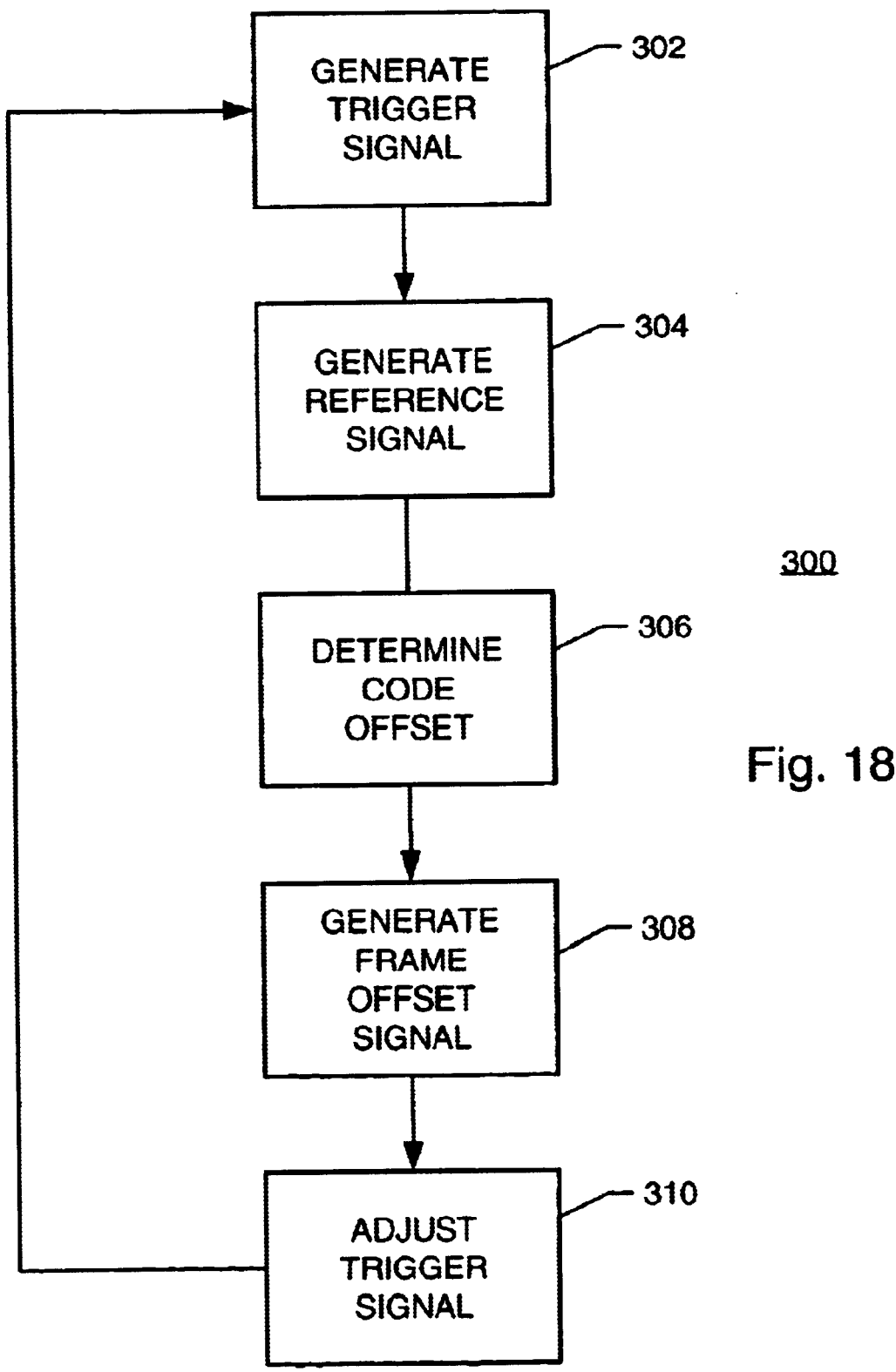
FIG. 18 is a block diagram illustrating the preferred embodiment of the method of the present invention.

FIG. 18 is a block diagram illustrating the preferred embodiment of the method of the present invention. In FIG. 18, a method 300 for effecting synchrony with a received transmitted signal in a wireless communication is represented. The transmitted signal is encoded according to a predetermined coding scheme and is arranges in a plurality of first frames in a first succession having a first period. Method 300 begins with generating a trigger signal, as indicated by a block 302. The trigger signal effects periodic sampling of the transmitted signal at a sampling node. The trigger signal and the transmitted signal cooperate at the sampling node to generate a detection indication signal.

Method 300 continues with generating a reference signal, as indicated by a block 304. The reference signal is generated in a plurality of second frames in a second succession having a second period. A base offset is established by the amount by which the first period and the second period differ.

Method 300 continues by determining a code offset as indicated by a block 306. The code offset is related to elapsed time following a beginning of a respective frame of the plurality of first frames during which an expression encoded according to the predetermined coding scheme may be received.

Method 300 continues by generating a frame offset signal, as indicated by a block 308. The frame offset signal involves the base offset and the code offset.

Method 300 continues by applying the frame offset to adjust time for sending the trigger signal, as indicated by a block 310. The sending of the trigger signal is adjusted from the second period to adjust synchrony with the transmitted signal.

Preferably, method 300 returns to the step indicated by block 302 for periodic implementation of method 300. In its most preferred embodiment, method 300 is iteratively repeated for each succeeding frame of said first succession of frames.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims.

What is claimed is:

1. An apparatus for effecting synchrony in a wireless communication system; said communication system including at least one transmitting station; said at least one transmitting station sending a transmission signal in a plurality of first frames in a first succession having a first period; said transmission signal being encoded according to a predetermined coding scheme; said communication system including a receiving station for receiving said transmission signal; said receiving station including an antenna for receiving said transmission signal; the apparatus comprising:
    (a) an oscillator device generating a receiver timing reference signal in a plurality of second frames in a second succession having a second period; an amount by which said first period and said second period differ establishing a base offset;
    (b) a timing circuit; said timing circuit being coupled with said antenna and generating a trigger signal for effecting periodic sampling of said transmission signal at a sampling node; said trigger signal and said transmission signals cooperating at said sampling node to generate a detection indication signal; said timing circuit receiving said receiver timing reference signal from said oscillator device;
    (c) a seeking device; said seeking device being connected with said sampling node and receiving said detection indication signal; said seeking device periodically imposing a stepwise timing variance to said detection indication signal to generate an incremented detection indication signal;
    (d) an offset generating device coupled with said seeking device; said offset generating device employing said incremented detection indication signal and said base offset to generate a frame offset signal;
    (e) a code reconstruction device coupled with said offset generating device and with said timing circuit; said code reconstruction device generating said predetermined coding scheme at said receiving station; said code reconstruction device generating a code offset signal related to said predetermined coding scheme; said timing circuit employing said receiver timing reference signal, said frame offset signal and said code offset signal to determine said trigger signal.

2. An apparatus for effecting synchrony in a wireless communication system as recited in claim 1 wherein said offset generating device further comprises a frame offset load control device for providing said frame offset at selected predetermined offset load times within selected frames of said second succession.

3. An apparatus for effecting synchrony in a wireless communication system as recited in claim 2 wherein said predetermined offset load times occur at a plurality of substantially equal intervals within said selected frames.

4. An apparatus for effecting synchrony in a wireless communication system as recited in claim 1 wherein said code reconstruction device includes a pseudorandom code generator generating a pseudorandom code signal, and includes a modulation code generator generating a modulation code signal; said code generating device employing said pseudorandom code signal and said modulation code signal in generating said code offset signal.

5. An apparatus for effecting synchrony in a wireless communication system as recited in claim 1, 2, 3 or 4 wherein said seeking device imposes said step-wise timing variance in a first step size when the apparatus seeks to acquire synchrony with said transmission signal, and wherein said seeking device imposes said step-wise timing variance in a second step size when the apparatus seeks to track said transmission signal to maintain synchrony with said transmission signal.

6. An apparatus for effecting synchrony in a wireless communication system as recited in claim 5 wherein said first step size is larger than said second step size.

7. A method for effecting synchrony in a wireless communication system; said communication system including at least one transmitting station; said at least one transmitting station sending a transmission signal in a plurality of first frames in a first succession having a first period; said transmission signal being encoded according to a predetermined coding scheme; said communication system including at least one receiving station for receiving said transmission signal; said receiving station including an antenna for receiving said transmission signal; the method comprising the steps of:
    (a) generating a receiver timing reference signal in a plurality of second frames in a second succession having a second period; an amount by which said first period and said second period differ establishing a base offset;
    (b) generating a trigger signal for effecting periodic sampling of said transmission signal at a sampling node; said trigger signal and said transmission signals cooperate at said sampling node to generate a detection indication signal; said timing circuit receiving said receiver timing reference signal from said oscillator device;
    (c) periodically imposing a stepwise timing variance to said detection indication signal to generate an incremented detection indication signal;
    (d) employing said incremented detection indication signal and said base offset to generate a frame offset signal;
    (e) generating a code offset signal based upon said predetermined coding scheme;

(f) employing said receiver timing reference signal, said frame offset signal and said code offset signal to determine said trigger signal; and (g) repeating steps (a) through (f) for each frame of said first succession to maintain said synchrony.

8. A method for effecting synchrony in a wireless communication as recited in claim 7 wherein step (d) further comprises: providing said frame offset at selected predetermined offset load times within selected frames of said second succession.

9. A method for effecting synchrony in a wireless communication system as recited in claim 8 wherein said predetermined offset load times occur at a plurality of substantially equal intervals within said selected frames.

10. A method for effecting synchrony in a wireless communication system as recited in claim 7 wherein said generating a code offset signal includes employment of a pseudorandom code signal and a modulation code signal.

11. A method for effecting synchrony in a wireless communication system as recited in claim 7, 8, 9 or 10 wherein said step-wise timing variance is imposed in a first step size when the method is employed to acquire synchrony with said transmission signal, and wherein said step-wise timing variance is imposed in a second step size when the method is employed to track said transmission signal to maintain synchrony with said transmission signal.

12. A method for effecting synchrony in a wireless communication system as recited in claim 11 wherein said first step size is larger than said second step size.

13. An apparatus for effecting synchrony with a received transmitted signal in a wireless communication system; said transmitted signal being encoded according to a predetermined coding scheme and arranged in a plurality of first frames in a first succession having a first period; the apparatus comprising:

(a) a timing circuit for generating a trigger signal for effecting periodic sampling of said transmitted signal at a sampling node; said trigger signal and said transmitted signal cooperating at said sampling node to generate a detection indication signal;

(b) a reference signal source coupled with said timing circuit for generating a reference signal for said timing circuit in a plurality of second frames in a second succession having a second period; an amount by which said first period and said second period differ establishing a base offset;

(c) an offset generator device; said offset generator device being coupled with said sampling node and with said timing circuit; said offset generator device receiving said detection indication signal; said offset generator device determining a code offset related to elapsed time following a beginning of a respective frame of said plurality of first frames during which an expression encoded according to said predetermined coding scheme can be received; said offset generator device generating a frame offset signal by which to effect adjusting sending said trigger signal by said timing circuit from said second period to adjust synchrony with said transmitted signal; said frame offset signal involving said base offset and said code offset.

14. An apparatus for effecting synchrony with a received transmitted signal in a wireless communication system as recited in claim 13 wherein said offset generator device includes a frame offset load control device for effecting loading said frame offset signal at selected predetermined offset load times within selected frames of said second succession.

15. An apparatus for effecting synchrony with a received transmitted signal in a wireless communication system as recited in claim 14 wherein said predetermined offset load times occur at a plurality of substantially equal intervals within said selected frames.

16. An apparatus for effecting synchrony with a received transmitted signal in a wireless communication system as recited in claim 13, 14 or 15 wherein said offset generator device periodically imposes a step-wise timing variance to said frame offset signal to vary said synchrony.

17. An apparatus for effecting synchrony with a received transmitted signal in a wireless communication system as recited in claim 16 wherein said step-wise timing variance is imposed in a first step size when the apparatus seeks to acquire synchrony, and wherein said step-wise timing variance is imposed in a second step size when the apparatus seeks to track said transmitted signal to maintain synchrony.

18. An apparatus for effecting synchrony with a received transmitted signal in a wireless communication system as recited in claim 17 wherein said first step size is larger than said second step size.

19. A method for effecting synchrony with a received transmitted signal in a wireless communication system; said transmitted signal being encoded according to a predetermined coding scheme and arranged in a plurality of first frames in a first succession having a first period; the apparatus comprising:

(a) generating a trigger signal for effecting periodic sampling of said transmitted signal at a sampling node; said trigger signal and said transmitted signal cooperating at said sampling node to generate a detection indication signal;

(b) generating a reference signal in a plurality of second frames in a second succession having a second period; an amount by which said first period and said second period differ establishing a base offset;

(c) determining a code offset related to elapsed time following a beginning of a respective frame of said plurality of first frames during which an expression encoded according to said predetermined coding scheme can be received;

(d) generating a frame offset signal involving said base offset and said code offset;

(e) applying said frame offset signal to adjust sending said trigger signal from said second period to adjust synchrony with said transmitted signal.

20. A method for effecting synchrony with a received transmitted signal in a wireless communication system as recited in claim 19 wherein said frame offset signal is provided according to a frame offset load control device; said frame offset load control device effecting loading said frame offset signal at selected predetermined offset load times within selected frames of said second succession.

21. A method for effecting synchrony with a received transmitted signal in a wireless communication system as recited in claim 20 wherein said predetermined offset load times occur at a plurality of substantially equal intervals within said selected frames.

22. Method for effecting synchrony with a received transmitted signal in a wireless communication system as recited in claim 19, 20 or 21 wherein said frame offset signal periodically includes a step-wise timing variance to vary said synchrony.

23. A method for effecting synchrony with a received transmitted signal in a wireless communication system as recited in claim 22 wherein said step-wise timing variance is included in a first step size when the method seeks to acquire synchrony, and wherein said step-wise timing variance is included in a second step size when the method seeks to track said transmitted signal to maintain synchrony.

24. A method for effecting synchrony with a received transmitted signal in a wireless communication system as recited in claim 23 wherein said first step size is larger than said second step size.

* * * * *